(12) United States Patent
Yamamoto

(10) Patent No.: US 7,992,041 B2
(45) Date of Patent: Aug. 2, 2011

(54) PERIPHERAL DEVICE, INTEGRATED CIRCUIT FOR PERIPHERAL DEVICE AND METHOD FOR ANALYZING FAILURE OF PERIPHERAL DEVICE

(75) Inventor: Kazushi Yamamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 233 days.

(21) Appl. No.: 12/376,257

(22) PCT Filed: Aug. 3, 2007

(86) PCT No.: PCT/JP2007/065245
§ 371 (c)(1),
(2), (4) Date: Feb. 3, 2009

(87) PCT Pub. No.: WO2008/016136
PCT Pub. Date: Feb. 7, 2008

(65) Prior Publication Data
US 2010/0005343 A1    Jan. 7, 2010

(30) Foreign Application Priority Data

Aug. 3, 2006  (JP) ................ 2006-212487

(51) Int. Cl.
*G06F 11/00* (2006.01)
(52) U.S. Cl. .......................... 714/27; 714/44
(58) Field of Classification Search .......... 714/47, 714/44, 27
See application file for complete search history.

(56) References Cited

U.S. PATENT DOCUMENTS

| | | | |
|---|---|---|---|
| 4,862,067 A | 8/1989 | Brune et al. | |
| 4,983,827 A | 1/1991 | Ikegaya et al. | |
| 5,802,071 A * | 9/1998 | Fang et al. | 714/724 |
| 6,282,501 B1 * | 8/2001 | Assouad | 702/117 |
| 6,976,190 B1 * | 12/2005 | Goldstone | 714/42 |
| 7,634,375 B1 * | 12/2009 | Pakzad et al. | 702/108 |
| 7,797,584 B2 * | 9/2010 | Hsieh et al. | 714/43 |
| 2002/0018379 A1 | 2/2002 | Hakuchoh et al. | |
| 2003/0005188 A1 * | 1/2003 | Tehrani et al. | 710/15 |
| 2006/0009939 A1 * | 1/2006 | Kotani et al. | 702/108 |
| 2007/0028143 A1 * | 2/2007 | Azimi et al. | 714/27 |

FOREIGN PATENT DOCUMENTS

| | | |
|---|---|---|
| JP | 1-127036 | 8/1989 |
| JP | 2-114156 | 4/1990 |
| JP | 9-297694 | 11/1997 |
| JP | 2001-273250 | 10/2001 |
| JP | 2002-41323 | 2/2002 |

(Continued)

OTHER PUBLICATIONS

International Search Report issued Sep. 4, 2007 in the International (PCT) Application No. PCT/JP2007/065245.

(Continued)

*Primary Examiner* — Bryce P Bonzo
(74) *Attorney, Agent, or Firm* — Wenderoth, Lind & Ponack, L.L.P.

(57) ABSTRACT

The peripheral device through an interface cable, and includes a second memory device for storing an evaluation program for evaluating the peripheral device and its integrated circuit. A detection section detects whether the mode indicating signal which is transmitted from the computer indicates a test mode or a normal mode, and a starting means starts the evaluation program on the second memory device when the detection section detects that the mode indicates signal a test mode.

19 Claims, 29 Drawing Sheets

FOREIGN PATENT DOCUMENTS

| | | |
|---|---|---|
| JP | 2002-216437 | 8/2002 |
| JP | 2002-252332 | 9/2002 |
| JP | 2004-361171 | 12/2004 |
| JP | 2006-23900 | 1/2006 |

OTHER PUBLICATIONS

Written Opinion of the ISA issued Sep. 4, 2007 in the International (PCT) Application No. PCT/JP2007/065245.

* cited by examiner

Fig.11

| CS1 | CS0 | DA2 | DA1 | DA0 |
|---|---|---|---|---|
| L | L | H | H | H |
| L | H | L | L | L |
| L | H | L | L | H |
| L | H | L | H | L |
| L | H | L | H | H |
| L | H | H | L | L |
| L | H | H | L | H |
| L | H | H | H | H | data signal  DD[0]=1
DD[1]~DD[15]=0

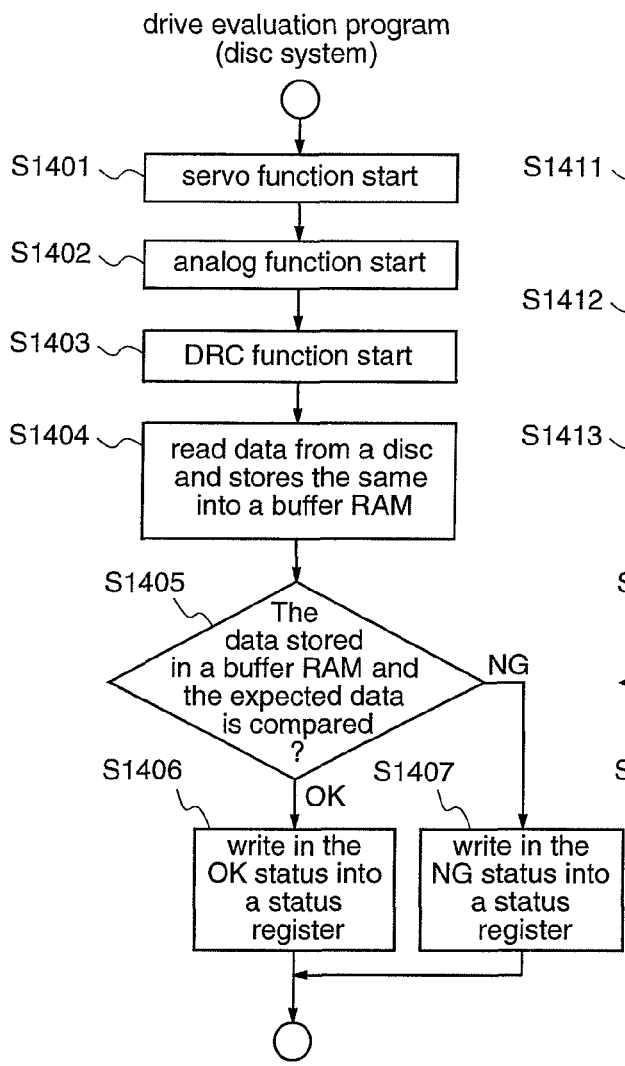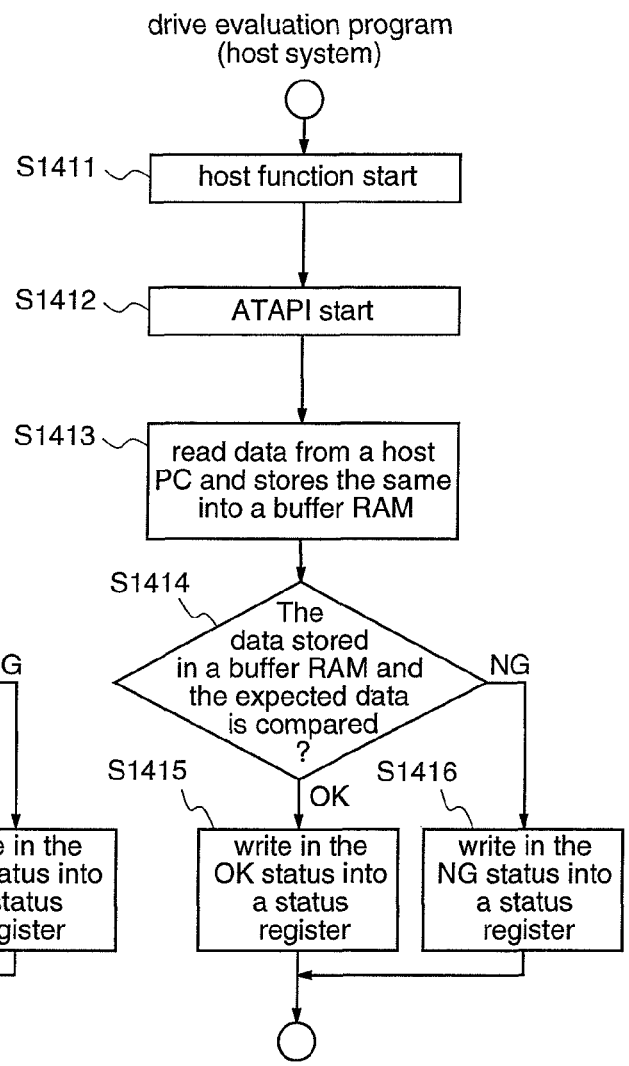

Fig.16 address map

| address | offset | register | set value |
|---|---|---|---|
| 0x40000000 | 0x0~0xFFFF | instruction ROM region | --- |
| 0x80000000 | 0x0~0xFFFFF | buffer RAM region | --- |
| 0x88000000 | 0x10 | system controller register | 0x10 |
| 0x88000000 | 0x20 | DRC start register | 0x10 |
| 0x88000000 | 0x30 | analog start register | 0x10 |
| 0x88000000 | 0x40 | servo start register | 0x10 |
| 0x88000000 | 0x50 | host start register | 0x10 |
| 0x88000000 | 0x60 | ECC start register | 0x10 |
| 0x88000000 | 0xC0~ | ATA/ATAPI register | --- |

| address | offset | register | expected value |
|---|---|---|---|
| 0x88000000 | 0x18 | system controller result register | 0x10 |
| 0x88000000 | 0x28 | DRC result register | 0x10 |
| 0x88000000 | 0x38 | analog result register | 0x10 |
| 0x88000000 | 0x48 | servo result register | 0x10 |
| 0x88000000 | 0x58 | host result register | 0x10 |
| 0x88000000 | 0x68 | ECC result register | 0x10 |
| 0x88000000 | 0x78 | LSI status register | 0x00 |

Fig.17 function evaluation register

| address | offset | register | expected value |
|---|---|---|---|
| 0x88000000 | 0x18 | system controller result register | 0x10 |
| 0x88000000 | 0x28 | DRC result register | 0xff |
| 0x88000000 | 0x38 | analog result register | 0x10 |
| 0x88000000 | 0x48 | servo result register | 0xff |
| 0x88000000 | 0x58 | host result register | 0x10 |
| 0x88000000 | 0x68 | ECC result register | 0xff |
| 0x88000000 | 0x78 | LSI status register | 0x00 |

Fig.18 specification of LSI status register

| 7 | 6 | 5 | 4 | 3 | 2 | 1 | 0 |
|---|---|---|---|---|---|---|---| bit 0 :    1 : Flash ROM failure         0 : OK
bit 1 :    1 : buffer RAM failure        0 : OK
bit 4 :    1 : disc system path failure  0 : OK
bit 5 :    1 : host path failure         0 : OK

Fig.21 address assignment of ATA register
which can be accessed by the computer

| address | register(Write) | register(Read) |
|---|---|---|
| 0x1F0 | Data register(16 bits) | |
| 0x1F1 | Features register | Error register |
| 0x1F2 | InterruptReason/SectorCount register | |
| 0x1F3 | SectorNumber register | |
| 0x1F4 | Cylinder Low register | |
| 0x1F5 | Cylinder High register | |
| 0x1F6 | Device/Head register | |
| 0x1F7 | Command register | Status register |
| 0x3F6 | DeviceControl | AlternateStatus |

Fig.22 address assignment of ATA register which can be
accessed by a system controller micro computer

| address | register(Write) | register(Read) |
|---|---|---|
| 0xC0 | ADAT register(16bits) | |
| 0xC1 | AFEA register | AERR register |
| 0xC2 | AIRR register | |
| 0xC3 | ASN register | |
| 0xC4 | ACL register | |
| 0xC5 | ACH register | |
| 0xC6 | ADH register | |
| 0xC7 | ACOM register | ASTA register |
| 0xC8 | ADC register | ALTS register |

Fig.23 reading out of the evaluation result

| address | data | processing content | evaluation result | |
|---|---|---|---|---|
| 0x1F7 | 0x10 | status register reading out | OK | (231) |
| 0x1F7 | 0xFF | status register reading out | NG | (232) |
| 0x1F7 | 0x10 | status register reading out | OK | (233) |
| 0x1F7 | 0xFF | status register reading out | NG | (234) |
| 0x1F7 | 0x10 | status register reading out | OK | (235) |
| 0x1F7 | 0xFF | status register reading out | NG | (236) |
| 0x1F7 | 0x10 | status register reading out | OK | (237) |

Fig.25 inspection result of the LSI

| address | data | processing content | inspection result | |
|---|---|---|---|---|
| 0x1F7 | 0x10 | status register reading out | OK | (251) |
| 0x1F7 | 0x10 | status register reading out | OK | (252) |
| 0x1F7 | 0x10 | status register reading out | OK | (253) |
| 0x1F7 | 0x10 | status register reading out | OK | (254) |
| 0x1F7 | 0x10 | status register reading out | OK | (255) |
| 0x1F7 | 0x10 | status register reading out | OK | (256) |
| 0x1F7 | 0xFF | status register reading out | NG | (257) |

Fig.26 inspection result of the LSI

| address | data | processing content | inspection result | |
|---|---|---|---|---|
| 0x1F7 | 0x10 | status register reading out | OK | (261) |
| 0x1F7 | 0xFF | status register reading out | NG | (262) |
| 0x1F7 | 0x10 | status register reading out | OK | (263) |
| 0x1F7 | 0xFF | status register reading out | NG | (264) |
| 0x1F7 | 0x10 | status register reading out | OK | (265) |
| 0x1F7 | 0xFF | status register reading out | NG | (266) |

Fig.27 inspection result of the LSI

| address | data | processing content | inspection result | |
|---------|------|--------------------|--------------------|---|
| 0x1F7 | 0x10 | status register reading out | OK | (271) |
| 0x1F7 | 0x10 | status register reading out | OK | (272) |
| 0x1F7 | 0x10 | status register reading out | OK | (273) |
| 0x1F7 | 0x10 | status register reading out | OK | (274) |
| 0x1F7 | 0x10 | status register reading out | OK | (275) |
| 0x1F7 | 0x10 | status register reading out | OK | (276) |
| 0x1F7 | 0xFF | status register reading out | NG | (277) |

Fig.33

ATA/ATAPI protocol between a computer and
a peripheral device

| address | data | content | |
|---|---|---|---|
| 0x1F7 | 0x11 | issue a test commnad | (331) |
| 0x1F7 | 0x01 | status register reading out | (332) |
| ... | | | |
| 0x1F7 | 0xA0 | issue an ATA command (packet command) | (333) |
| 0x1F0 | 0x2A | issue an ATAPI(Write(10))command | (334) |
| 0x1F0 | 0x00 | | (335) |
| 0x1F0 | 0x00 | LBA(upper) | (336) |
| 0x1F0 | 0x00 | LBA | (337) |
| 0x1F0 | 0x00 | LBA | (338) |
| 0x1F0 | 0x00 | LBA(lower) | (339) |
| 0x1F0 | 0x00 | | (340) |
| 0x1F0 | 0xFF | transfer length(upper) | (341) |
| 0x1F0 | 0xFF | transfer length(lower) | (342) |
| 0x1F0 | 0x00 | | (343) |
| 0x1F0 | 0x00 | | (344) |
| 0x1F0 | 0x00 | | (345) |
| ... | | | |
| 0x1F0 | 0xF0 | data (evaluation program)transfer | (346) |
| 0x1F0 | 0xF1 | data (evaluation program)transfer | (347) |
| ... | | | |
| 0x1F0 | 0xF2 | data (evaluation program)transfer | (348) |
| 0x1F0 | 0x00 | program conclusion status reading out | (349) |
| ... | | | |
| 0x1F7 | 0x10 | status register reading out | (350) |
| 0x1F7 | 0xFF | status register reading out | (351) |
| 0x1F7 | 0x10 | status register reading out | (352) |
| 0x1F7 | 0xFF | status register reading out | (353) |
| 0x1F7 | 0x10 | status register reading out | (354) |
| 0x1F7 | 0xFF | status register reading out | (355) |
| 0x1F7 | 0x10 | status register reading out | (356) |

PERIPHERAL DEVICE, INTEGRATED CIRCUIT FOR PERIPHERAL DEVICE AND METHOD FOR ANALYZING FAILURE OF PERIPHERAL DEVICE

BACKGROUND OF THE INVENTION

1. Technical Field

The present invention relates to a peripheral device which is connected to a computer, an integrated circuit which is incorporated in a peripheral device, and a method for analyzing failure of a peripheral device.

2. Background Art

Recently, with being accompanied by reduction in the number of peripheral devices as well as reduction in the number of parts which are mounted on the peripheral device, an inspection or a failure analysis of a peripheral device or a system LSI which is mounted on a peripheral device have become difficult.

For example, as an example of a peripheral device or a method of inspecting an optical disc device, there is a method of reproducing a test disc to obtain information from an optical disc device as a target of inspection (for example, patent document 1).

In addition, as an example of a method for inspecting a mounting board which is mounted in a peripheral device, there is a method which comprises performing an entire surface scanning by a laser light and detecting scattered lights which are reflected from the print circuit board, thereby detecting a mounting failure such as a positional deviation of parts which are mounted on a print circuit board (for example, patent document 2).

Further, as an example of a method for inspecting a board mounting memory which is mounted in a peripheral device, there is a method which comprises a system control microcomputer only performing an issuance of a selective switching instruction to a demodulation LSI through a selector, which instruction switches to performing an inspection control by an inspector, thereby making an inspector performing an inspection of a board mounted memory (for example, patent document 3).

A prior art peripheral device and a prior art method of analyzing a peripheral device will be described with raising an example of an optical disc device and a method of analyzing an optical disc device.

A prior art optical disc device and a prior art method for analyzing an optical disc device will be hereinafter described with reference to FIGS. 29 and 30.

FIG. 29 is a construction diagram of a prior art disc device. In FIG. 29, the peripheral device 1 which is an optical disc device is connected to a computer 2 via an interface cable 2816. An ATA cable, a USB, IEEE1394, Serial ATA, or SCSI are raised as the interface cable 2816.

The peripheral device 1 is provided with an integrated circuit 4 of the peripheral device, a flash ROM 5 on which a system control microcomputer firmware is stored, a spindle motor 2824 which rotates a disc 2825, a driver 6 which drives the spindle motor 2824, an optical pickup 2826 which emits a laser light to the disc 2825 and receives the light reflected from the disc, a laser diode driver (LDD) 7 which controls the laser light of the optical pickup 2826, an OEIC (optical Integrated Circuit) 8 as an opto-electronic integrated circuit which converts the optical signal from the optical pickup 2826 into an electric signal (digital signal), and an FEP (Front End Processor) 9 which pre-processes the signal from the OEIC 8 to output the result to the integrated circuit 4.

The integrated circuit 4 is, particularly, a system LSI of a peripheral device, and it includes a first memory device 12 comprising a ROM, a second memory device (DRAM) 13 comprising a buffer RAM for temporary storing the input/output data from the disc 2825 and the input/output data from the computer 2, a system control microcomputer 14, a CPU 17, a digital read channel circuit (DRC) 2801 which processes the signal from the FEP 9, an analog circuit 2802, a servo circuit 2803 which controls the driver 6, a host circuit (or ATAPI circuit) 2804, an error correction circuit (ECC) 2805, and a dumping resister 2806 which is mounted between the host circuit 2804 and a connector which is connected to the computer 2. Here, the paths 2807, 2808, 2810, 2812, and 2813 are those which connect between the dedicated communication circuits inside the integrated circuit 4. In addition, the path 2809 is one which connects the Flash ROM 5 and the system control microcomputer 14, and the paths 2817, 2818, 2819, 2820, 2821, 2822, and 2823 are those which connect the integrated circuit 4 and its external parts, which paths are controlled in the disc system processing, i.e., in inputting/outputting of data from the disc. In addition, the paths 2815, 2816 are those which connect the integrated circuit 4 and its external parts, which paths are controlled in the host system processing, i.e., in inputting/outputting of data between the computer 2 and the peripheral device 1.

When inspecting the peripheral device 1 which is thus constructed, the computer 2 issues using the inspection tool 2901 provided thereon a command to control the peripheral device 1, and the computer 2 inspects the peripheral device 1 on the basis of the transfer data or status response which are outputted from the peripheral device 1 in response to the command from the computer 2. Here, the commands are those such as Write system commands or Read system commands, which were incorporated in order to realize common functions of the product among the command codes and parameter tables which are described in the ATA/ATAPI standard specifications.

FIG. 30 is a diagram illustrating a device for analyzing failure of the peripheral device 1 as an optical disc device. The same constitutional elements as those in the peripheral device of FIG. 29 are denoted by the same reference numerals, with description thereof omitted).

In FIG. 30, when the failure analysis device judged the failure of the optical disc device 1 in inspecting the optical disc device 1, the ATA bus monitor 304, which is connected between the computer 2 and the optical disc device 1 and is designed to analyze the signal of the ATA bus, analyzes the signals which are transmitted and received between the computer 2 and the optical disc device 1. In addition, in order to debug the firmware of the system control microcomputer 14 which controls the optical disc device 1, the optical disc device 1 is provided with the connector 303 for the debugger 302 mounted. Therefore, it is needed to carry out a fabrication of attaching the connector 303 to the mounting board of the optical disc device 1. In addition, a probe 305 is applied to a terminal of a part that is mounted on a mounting board of the optical disc device 1, and the signal obtained thereat is analyzed by a logic analyzer (or an oscilloscope) 301. However, such a method has a limitation in confirming the internal operation of the integrated circuit (LS1) 4 which is mounted in the optical disc device 1, thereby making it difficult to find whether the optical disc device includes a problem or the LSI includes a problem. Therefore, the failure analysis is performed according to the following inspection flow.

FIG. 31 is a diagram showing a failure analysis flow in the prior art when the inspection of the optical disc device has revealed the failure of the optical disc device. In the following description of the flow, "drive" means an optical disc device and "LSI" means an integrated circuit.

Step S3101: an inspection of the "drive" is performed on the computer 2 using an inspection tool.

Step S3102: whether the result of the "drive" inspection in Step S3101 is OK or NG is judged.

Step S3103: when the inspection result in step S3102 is OK, the "drive" is determined as OK.

Step S3104: when the "drive" failure is detected in step S3102, the mounting board is inspected. For example, the failure of mounting such as positional deviation of a part mounted on the print circuit board is detected by scanning a laser light over the entire surface on the print circuit board, and detecting the scattered light reflected from the print circuit board (for example, patent document 2).

Step S3105: whether the inspection result of the mounting board in step S3104 is OK or NG is judged.

Step S3106: when the inspection result of the mounting board in step S3105 is judged as OK, the integrated circuit (LSI) as an inspection target is peeled off from the "drive", an LSI which is previously determined as good product is alternately attached to the "drive", and an inspection of the "drive" is again performed.

Step S3107: when the inspection result of the mounting board in step S3105 is judged as NG, the location of the mounting failure is specified, and a part is re-mounted.

Step S3108: whether the result of the "drive" inspection in step S3106 is OK or NG is judged.

Step S3109: when the result of the "drive" inspection in step S3106 is judged as NG, the "drive" is determined as NG, and then the inspection target "LSI" is mounted in a drive which is previously determined as good product, and an inspection of the driven is performed.

Step S3110: whether the result of the "drive" inspection in step S3109 is OK or NG is judged.

Step S3111: when the result of the "drive" inspection in step S3110 is judged as OK, the "drive" is determined as NG.

Step S3112: when the result of the "drive" inspection in step S3108 is judged as OK, or when the result of the "drive" inspection in step S3110 is judged as NG, the inspection target "LSI" determined as NG, and then the LSI is peeled off, and an LSI inspection is carried out by an LSI evaluation board and a tester.

Step S3113: whether the result of "LSI" inspection in step S3112 is OK or NG is judged.

Step S3114: when the result of "LSI" inspection in step S3113 is judged as NG, the "LSI" is determined as NG.

Step S3115: when the result of the "LSI" inspection in step S3313 is judged as OK, it is determined as connection failure between the "drive" and the "LSI", and re-mounting is performed and the "drive" is re-inspected.

Next, as a prior art concrete method for analyzing the optical disc device, cases of (E1) where a failure cause is present outside the LSI, (E2) where a failure cause is present inside the LSI, and (E3) where a failure cause is present at the connection portion between the optical disc device and the LSI, will be described with reference to FIG. 31.

(E1) where a cause of failure is present outside the LSI;

E101: in step S3101, the inspection of the "drive" is performed on the computer 2 using an inspection tool.

E102: in step S3102, whether the result of the "drive" inspection is OK or NG is judged. When as a result it is determined as NG, the processing transits to step S3104.

E103: in step S3104, an inspection of the mounting substrate is performed.

E104: in step S3105, whether the inspection result of the mounting board is OK or NG is judged. As a result, it may be determined as OK.

E105: in step S3106, the LSI as a target object is peeled off from the "drive", an LSI which is previously determined as good product is alternately attached to the "drive", and an inspection of the "drive" is again performed.

E106: in step S3108, whether the result of the "drive" inspection is OK or NG is judged. As a result, it may be judged as NG.

E107: since the result of the "drive" inspection in step S3108 is judged as NG, the "drive" may be judged as NG, and an inspection target LSI is mounted on a good product "drive", and an inspection of the "drive" is performed.

E108: in step S3110, the result of the "drive" inspection may be determined as OK.

E109: in step S3111, the "drive" may be determined as NG, and the mounting board of the "drive" is analyzed.

(E2) where a cause of failure is present inside the LSI;

E110: in step S3101, the inspection of the "drive" is performed on the computer 2 using an inspection tool.

E111: in step S3102, the result of the "drive" inspection in step S3101 may be determined as NG, and the processing transits to step S3104.

E112: since the "drive" is judged as including failure in step S3102, the mounting substrate is inspected in step S3104. For example, the mounting failure such as positional deviation of the part mounted on the print circuit board is detected by scanning a laser light over the entire surface on the print circuit board and detecting the scattered light from the print circuit board (for example, patent document 2).

E113: in step S3105, the result of the inspection of the mounting substrate in step S3104 may be judged as OK.

E114: since in step S3106 the result of the inspection of the mounting may be determined as OK, the inspection target LSI is peeled off from the "drive", an LSI which is previously determined as good product is alternately attached to the drive, and an inspection of the "drive" is performed.

E115: in step S3108, the result of the "drive" inspection in step S3106 may be judged as OK, and the processing transits to step S3112.

E116: since in step S3108 the result of the "drive" inspection may be determined as OK, in step S3112, the inspection target "LSI" may be determined as NG, the LSI is peeled off, and the "LSI" inspection is performed by the LSI evaluation board and the tester shown in FIG. 32.

E117: in step S3113, the "LSI" inspection in step S3112 may be judged as NG.

E118: in step S3114, the "LSI" may be judged as NG.

(E3) where a cause of failure is present at the connection portion with the "LSI";

E120: in step S3101, the inspection of the "drive" may be performed on the computer 2 using an inspection tool.

E121: in step S3102, the result of the "drive" inspection in step S3101 may be judged as NG, and the processing transits to step S3104.

E122: since the "drive" is judged as including failure in step S3102, in step S3104, the mounting board is inspected. For example, the mounting failure such as positional deviation of the part mounted on the print circuit board is detected by scanning a laser light over the entire surface on the print circuit board, and detecting the scattered light reflected from the print circuit board (for example, patent document 2).

E123: in step S3105, the inspection result of the mounting substrate in step S3104 may be judged as OK.

E124: since in step S3105 the inspection result of the mounting board may be judged as OK, in step S3106, the LSI as an inspection target is peeled off from the optical disc device, the LSI which is previously determined as good product is alternately attached to the drive, and an inspection of the "drive" is again performed.

E125: in step S3108, the result of the "drive2 inspection in step S3106 may be judged as OK, and the processing transits to step S3112.

E126: since in step S3108 the result of the drive inspection may be judged as OK, the inspection target LSI may be judged as NG in step S3112, and the LSI is peeled off and an inspection of the "LSI" is performed by the LSI evaluation board and the tester shown in FIG. 32.

E127: in step S3113, the "LSI" inspection in step S3112 may be determined as OK.

E128: in step S3115 the "LSI" may be judged as OK, and it is judged as there is connection failure between the drive and the LSI, and then, re-mounting is performed and a re-inspection of the "drive" is performed.

Next, an LSI evaluation board for evaluating an LSI and a method for analyzing failure of the LSI will be described with reference to FIG. 32. The same constitutional elements as those in the optical disc device of FIG. 29 are denoted by the same reference numerals, with description thereof omitted.

FIG. 32 shows a construction of an LSI evaluation board 320. The LSI evaluation board 320 comprises an integrated circuit (LSI) 4 as an evaluation target, a virtual host memory 321, a virtual disc memory 322, and a virtual system computer memory 323. The virtual host memory 321 is an FPGA (Field Programmable Gate Array) memory which has incorporated circuits so as to perform similar operations as the computer 2 which is connected to the peripheral device. The virtual system computer memory 323 includes a memory for storing a program which controls the virtual disc memory 322 and the virtual host memory 321 as well as further controls the system control microcomputer 14, and thereby controls the LSI as an evaluation target. The virtual host memory 321, the virtual disc memory 322, and the virtual system computer memory 323 are respectively connected to the LSI as an evaluation target. By this LSI evaluation board 320, it is possible to inspect and evaluate the CPU 17, the DRC 2801, the analog circuit 2802, the servo circuit 2803, the second memory device 13, the host circuit 2804, the ECC 2805, the system control microcomputer 14, and the paths 2807, 2808, 2810, 2811, 2812, 2813, and 2827.

Patent Document 1: Japanese Published Patent Application No. 2002-216437
Patent Document 2: Japanese Published Patent Application No. Hei. 2-114156
Patent Document 3: Japanese Published Patent Application No. 2002-252332

In the conventional failure analysis method for an optical disc device, when performing an inspection of an integrated circuit (LSI) or a re-inspection of an optical disc device (drive), a work of alternately attaching an LSI of an optical disc device is necessitated (step S3106, step S3109 in FIG. 31). Therefore, there is required a work of peeling off an LSI from a mounting board, absorbing solder which is remaining on the board, and soldering a new LSI. Since this work is normally carried out manually, it is likely that a work failure will arise. In addition, in a case of an LSI such as FBGA (Fine pitch Ball Grid Array Package) which is made applicable to multiple pins, the alternate attaching work is difficult in view of its configuration.

In addition, when the inspection of the mounting board is performed (by step S3104 in FIG. 34), for example, a method described in patent document 2 is adopted, in which the mounting failure such as positional deviation of a part mounted on the print circuit board is detected by scanning a laser light over the entire surface on the print circuit board, and detecting the scattered light reflected from the print circuit board. However, this method arises a problem that the failure of the part itself that is cannot be predicted or found by an automatic inspection.

In addition, if the device for inspecting the on-board mounted memory as shown in patent document 3 is adopted in performing the failure analysis of the optical disc device, due to that a system control microcomputer and a decoding LSI are mounted on the optical disc device, it would not be possible to control a selector from the computer 2, and it would not be possible to distinguish between the failure in the optical disc device and the failure in the LSI, and thereby a process of peeling off the LSI from the optical disc device is required.

Further, in the prior art failure analysis method for an optical disc device, in a case (E3) where the cause of failure is present at the connection portion between the optical disc device and the LSI, the LSI is peeled off, the inspection of the LSI is performed by the LSI evaluation board 321 (E126), and then the LSI inspection is judged as OK (E127), and therefore, the failure portion cannot be specified in the later step. Therefore, it is necessary to re-mount an LSI and perform a re-examination of the drive, which unfavorably increases the number of processing steps.

The present invention is directed to solving the above-described problems and has for its object to provide a peripheral device, an integrated circuit for a peripheral device, and a method for analyzing failure of a peripheral device which can perform a failure analysis of the peripheral device or the integrated circuit for a peripheral device in a state where the integrated circuit is mounted on the peripheral device.

SUMMARY OF THE INVENTION

According to the present invention, there is provided a peripheral device which is connected to a computer through an interface, comprising: a detection section which interprets a mode indicating signal on an interface standard, which signal is inputted from said computer, and detects whether said mode designating signal indicates a normal mode or a test mode; a first memory device for storing a program which is executed by said peripheral device at a normal mode; a second memory device for storing an evaluation program that is transmitted from said computer, which evaluation program is on said peripheral device and said integrated circuit for a peripheral device; and a starting means which starts said program in said first memory device when being in the normal mode is detected by said detection section, and starts said evaluation program stored in said second memory section on said peripheral device and said integrated circuit for a peripheral device when being in the test mode is detected by said detection section.

According to the present invention, there is provided a peripheral device which is connected to a computer through an interface, comprising: a command receiving section which receives a command on an interface standard, which command is outputted from said computer; a first memory device for storing a program which is executed by said peripheral device at a normal mode; a second memory device for storing an evaluation program that is transmitted from said computer, which evaluation program is on said peripheral device and said integrated circuit for a peripheral device; and a starting means which starts a program in said first memory device when said command receiving section has received a normal command, and starts an evaluation program on said peripheral device and on said integrated circuit for a peripheral device in said second memory device when said command receiving section has received a test command indicating being in the test mode.

According to the present invention, there is provided a transfer means which, when being in the test mode is detected by said detection section, receives from said computer said evaluation program on said peripheral device and said integrated circuit for a peripheral device, and transfers same to said second memory device.

According to the present invention, said mode indicating signal is an ATA interface bus signal.

According to the present invention, wherein there is provided a transfer means which, when the command receiving section receives a test command, receives from said computer an evaluation program on said peripheral device and said integrated circuit for a peripheral device, and transfers same to said second memory section.

In addition, according to the present invention, there is provided an integrated circuit for a peripheral device which is connected to a computer through an interface, comprising: a detection section which interprets a mode indicating signal on an interface standard, which signal is outputted from said computer, and detects whether said mode indicating signal indicates a normal mode or a test mode; a first memory device for storing a program which is executed by said peripheral device in the normal mode; a second memory device for storing an evaluation program that is transmitted from said computer, which evaluation program is on said peripheral device and said integrated circuit for a peripheral device; and a starting means which starts a program in said first memory device when being in the normal mode is detected by said detection section, and starts said evaluation program in said second memory device, which evaluation program is on said peripheral device and said integrated circuit for a peripheral device, when being in the test mode is detected by said detection section.

In addition, according to the present invention, there is provided an integrated circuit for a peripheral device which is connected to a computer through an interface, comprising: a command receiving section which receives a command on an interface standard, which command is outputted from said computer; a first memory device for storing a program which is executed by said peripheral device in a normal mode; a second memory device for storing an evaluation program that is transmitted from said computer, which evaluation program is on said peripheral device and said integrated circuit for a peripheral device; and a starting means which starts a program in said first memory device when being in the normal mode is detected by said detection section, and starts said evaluation program in said second memory device on said peripheral device and said integrated circuit for a peripheral device when being in the test mode is detected by said detection section.

In addition, according to the present invention, there is further provided a transfer means which, when being in the test mode is detected by said detection section, receives from said computer said evaluation program on said peripheral device and on said integrated circuit for a peripheral device.

In addition, according to the present invention, there is further provided a transfer means which, when being in the test mode is detected by said command receiving section, receives from said computer said evaluation program on said peripheral device and said integrated circuit for a peripheral device.

In addition, according to the present invention, there is provided a failure analysis device which performs a failure analysis of a peripheral device and an integrated circuit for a peripheral device, comprising: a computer including: a first transfer means for transferring an evaluation program on said peripheral device and said integrated circuit for a peripheral device to said peripheral device through an interface; a mode driving means which outputs a mode indicating signal on an interface standard, which signal is indicating whether said peripheral device is operated in a normal mode or in a test mode to said peripheral device; and a judging means for judging the evaluation result of said peripheral device and said integrated circuit, obtained by said evaluation program; said peripheral device comprising: a detection section which interprets said mode indicating signal on an interface standard, which signal is outputted from said computer, and detects whether said mode indicating signal indicates the normal mode or the test mode; a first memory device for storing a program which is executed by said peripheral device at the normal mode; a second memory device for storing said evaluation program that is transmitted from said computer, which evaluation program is on said peripheral device and said integrated circuit for a peripheral device; and a second transfer means which, when being in the test mode is detected by said detection section, receives from said computer said evaluation program on said peripheral device and said integrated circuit for a peripheral device, and transfers same to said second memory device; and a starting means which starts said program in said first memory device when being in the normal mode is detected by said detection section, and starts said evaluation program which is stored in said second memory device, which evaluation program is on said peripheral device and said integrated circuit for a peripheral device when being in the test mode is detected by said detection section; and a communication means which communicates the evaluation result of said peripheral device and said integrated circuit for a peripheral device to said computer; where said judging means in said computer, when the evaluation results of said peripheral device and said integrated circuit are received, starts said evaluation program in said computer and judges the state of said peripheral device and said integrated circuit.

In addition, according to the present invention, there is provided a failure analysis device which performs a failure analysis of a peripheral device and an integrated circuit for a peripheral device, comprising: a computer including: a first transfer means for transferring an evaluation program on said peripheral device and said integrated circuit for a peripheral device to said peripheral device through an interface; a command issuing means which outputs a command to said peripheral device; a judging means for judging evaluation result of said peripheral device and said integrated circuit, obtained by said evaluation program; said peripheral device includes: a command receiving section which receives a command on an interface standard, which command is outputted from said computer; a first memory device for storing a program which is executed by said peripheral device at the normal mode; a second memory device for storing said evaluation program that is transmitted from said computer, which program is on said peripheral device and on said integrated circuit for a peripheral device; a second transfer means which, when being in the test mode is detected by said command receiving section, receives from said computer said evaluation program on said peripheral device and said integrated circuit for a peripheral device, and transfers same to said second memory device; and a starting means which starts said program in said first memory device when said command receiving section has received a normal command, and starts said evaluation program which is stored in said second memory device, which evaluation program is on said peripheral device and said integrated circuit for a peripheral device, when said command receiving section has received a test command indicating being in the test mode; where said judging means in said computer which, when the evaluation result obtained on said peripheral device and said integrated circuit is received, starts said evaluation program in said computer and judges the state of said peripheral device and said integrated circuit.

In addition, according to the present invention, there is provided a failure analysis method which performs a failure analysis of a peripheral device which is connected to a computer through an interface and an integrated circuit for a peripheral device, comprising: a transmission step of transmitting to said peripheral device through an interface a mode indicating signal on an interface standard, which indicates whether said peripheral device is operated in a normal mode or in a test mode; a transfer step of transferring an evaluation program on said peripheral device and said integrated circuit for a peripheral device to said peripheral device from said computer; a detection step of interpreting a mode indicating signal on an interface standard, and detecting whether said mode indicating signal indicates the normal mode or the test mode; a receiving step of receiving said evaluation program by said peripheral device; a mode transiting step of transiting, when that the mode indicating signal indicates the test mode is detected in said mode detecting step, making said peripheral device transit to the test mode; a starting step of, when the transition to the test mode has occurred, resetting the program under being executed and starting said evaluation program on said peripheral device and said integrated circuit for a peripheral device; an evaluation step of evaluating said peripheral device and said integrated circuit for a peripheral device using said evaluation program on said peripheral device and said integrated circuit; a communication step of communicating the evaluation result obtained in said evaluation step to said computer from said peripheral device; a judging step of, when said computer has not received the evaluation result from said peripheral device, judging as connection error existing between said computer and said peripheral device, while when said computer has received said evaluation result from said peripheral device, starts said evaluation program in said computer, and judges the state of said peripheral device and said integrated circuit on the basis of said evaluation result.

In addition, according to the present invention, said transfer step comprises, after the test indicating signal indicating the test mode is transmitted in said transmission step, transferring said evaluation program on said peripheral device and said integrated circuit for a peripheral device from said computer to said peripheral device, said receiving step comprising, when that the mode indicating signal indicates a test mode is detected in said detecting step, receiving said evaluation program which is transmitted from said computer and which is on said peripheral device and said integrated circuit for a peripheral device, and said mode transfer step comprises, after the reception of said evaluation program on said peripheral device and said integrated circuit for a peripheral device is completed, making said peripheral device transit to the test mode.

In addition, according to the present invention, said transmission step comprises, after the transfer of said evaluation program on said peripheral equipment device and said integrated circuits for a peripheral device in said transfer step is completed, transmitting a test mode indicating signal from said computer to said peripheral device, and said mode transfer step comprises, when that said mode indicating signal indicates a test mode is detected in said detection step, making said peripheral device transit to the test mode.

In addition, according to the present invention, said evaluation program includes an integrated circuit evaluation program for evaluating the state of said integrated circuit, and a peripheral device evaluation program for evaluating the state of said peripheral device, and said evaluation step comprises: an integrated circuit evaluation step of judging whether said integrated circuit is good product or not by said integrated circuit evaluation program; a peripheral device evaluation step of judging, when said integrated circuit is determined as good product in said integrated circuit evaluation step, whether said peripheral device is good product or not by said peripheral device evaluation step; a mounting inspection step of performing, when said peripheral device is determined as failure in said peripheral device evaluation step, mounting inspection of said peripheral device; a specifying step of, when it is determined as good product in said mounting inspection step, specifying the mounting failure portion in said peripheral device; and a production step of, when it is determined as good in said mounting inspection step, producing an evaluation program for specifying the mounting failure portion in said peripheral device.

In addition, according to the present invention, said peripheral device evaluation program includes an evaluation program for evaluating a path between said peripheral device and said integrated circuit.

In addition, according to the present invention, there is provided a failure analysis method which performs a failure analysis of a peripheral device which is connected to a computer through an interface and an integrated circuit for a peripheral device, comprising: a command issuing step issuing a test command on an interface standard, which command is outputted from said computer to said peripheral device, a command receiving step of receiving said command by said peripheral device; a transfer step of transferring from said computer to said peripheral device an evaluation program on said peripheral device and said integrated circuit for a peripheral device; a program receiving step of receiving said evaluation program on said peripheral device and said integrated circuit for a peripheral device by said peripheral device; a starting step of, when said test command indicating being in the test mode is received in said command receiving step, resetting the program being executed, and starting said evaluation program on said peripheral device and said integrated device for a peripheral device in said peripheral device; an evaluation step of evaluating said peripheral device and said integrated circuit by said evaluation program; a communication step of communicating the evaluation result obtained in said evaluation step from said peripheral device to said computer; a judging step of, when said computer does not receive the evaluation result from said peripheral device, judging as connection error existing between said computer and said peripheral device, and when said computer has received said evaluation result from said peripheral device, starting said evaluation program in said computer, and judging the state of said peripheral device and said integrated circuit on the basis of said evaluation result.

In addition, according to the present invention, said transfer step comprises, after issuing a test command in said command issuing step, transferring from said computer to said peripheral device said evaluation program on said peripheral device and said integrated circuit for a peripheral device, said program receiving step comprises, when said test command is received in said command receiving step, receiving said evaluation program on said peripheral device and said integrated circuit for a peripheral device, and said test mode transiting step comprises, when the reception of said evaluation program on said peripheral device and said integrated circuit for a peripheral device is completed, making said peripheral device transit to the test mode.

In addition, according to the present invention, said command issuing step comprises, after said evaluation program on said peripheral device and on said integrated circuit for a peripheral device is transferred from said computer to said peripheral device, issuing said test command, and said mode transiting step comprises, when said test command is received in said command receiving step, making said peripheral device to the test mode.

According to the present invention, since in the failure analysis of a peripheral device, the evaluation program which is transferred from the computer and is stored in the second memory device in the peripheral device is activated in the test mode, and the peripheral device is evaluated with using the evaluation program on the peripheral device and the integrated circuit for a peripheral device, the integrated circuit and the peripheral device can be evaluated in a state where the integrated circuit and the peripheral device are connected with each other, without providing a process of peeling off the peripheral device from the integrated circuit. As a result, the work failure that may occur in the process of alternately attaching the integrated circuit to the peripheral device can be reduced.

According to the present invention, since the failure of the peripheral device can be judged with using the evaluation program on the peripheral device when there is failure in the part mounted on the peripheral device, whether the failure portion is present in the peripheral device or in the integrated circuit can be predicted, and thereby enabling narrowing of the range in which the failure portion exists.

According to the present invention, since the evaluation program on the peripheral device and the integrated circuit for a peripheral device is transferred from the computer to the peripheral device in the test mode, whether the integrated circuit is good product or not is judged by the evaluation program on the integrated circuit, when the integrated circuit is judged as good product, whether the peripheral device is good product or not is judged by the evaluation program on the peripheral device, when the peripheral device is judged as no good product, the mounting inspection of the peripheral device is performed, when the mounting inspection is judged as no good, the mounting failure portion is specified, when the mounting inspection is judged as good, an evaluation program for specifying the mounting failure portion is produced, and the peripheral device and the integrated circuit are re-evaluated by the evaluation program, the integrated circuit and the peripheral device can be evaluated, without providing a process of peeling off the peripheral device from the integrated circuit. As a result, the failure analysis of the peripheral device and the integrated circuit for a peripheral device can be performed in a state where the computer and the peripheral device are connected to each other. Further, even when the peripheral device and the integrated circuit are re-inspected, the re-inspection can be performed by the new evaluation program without providing a process of peeling off the peripheral device from the integrated circuit.

In addition, according to the present invention, since the peripheral device evaluation program for evaluating the peripheral device includes an evaluation program for evaluating a path between the peripheral device and the integrated circuit, when there is a failure at the connection portion between the peripheral device and the integrated circuit, it is once judged as failure of the peripheral device by the peripheral device evaluation program, and thereafter, the mounting inspection is performed and the mounting failure can be judged. Therefore, it is possible to perform a failure analysis of the peripheral device and the integrated circuit for a peripheral device, without providing a process of alternately attaching the integrated circuit to the peripheral device, even when there is a failure at the connection portion between the peripheral device and the integrated circuit.

BRIEF DESCRIPTION OF THE DRAWINGS

FIG. 11 a diagram illustrating the operation of a decoder in the peripheral device according to the first embodiment of the present invention.

FIG. 14a is a flow diagram of a drive evaluation program (disc system) which is used in a failure analysis method of a peripheral device according to the first embodiment of the present invention and FIG. 14b is a flow diagram of a drive evaluation program (host system) which is used in a failure analysis method of a peripheral device according to the first embodiment of the present invention.

FIG. 16 is a diagram illustrating an address map in the integrated circuit of a peripheral device according to the first embodiment of the present invention.

FIG. 17 is a diagram illustrating the function evaluation result which is obtained as the result that the function evaluation program shown in FIG. 1 is operated.

FIG. 18 is a diagram illustrating the specification of the LSI system status register in the integrated circuit for a peripheral device according to the first embodiment of the present invention.

FIG. 21 is a diagram illustrating an address allocation of the ATA register in the integrated circuit for a peripheral device, which register can be accessed form a computer in the first embodiment of the present invention.

FIG. 22 is a diagram illustrating an address allocation for the ATA register, which can be accessed from a system control microcomputer in the peripheral device according to the first embodiment of the present invention.

FIG. 23 is a diagram illustrating the evaluation result on the ATA/ATAPI protocol, which is obtained in the failure analysis method according to the first embodiment of the present invention.

FIG. 25 is a diagram illustrating the value of the status register in a case where the cause of failure exists outside the integrated circuit (LSI) in the failure analysis method according to the first embodiment of the present invention.

FIG. 26 is a diagram illustrating the value of the status register in a case where the cause of failure exists inside the integrated circuit (LSI) in the failure analysis method according to the first embodiment of the present invention.

FIG. 27 is a diagram illustrating the value of the status register in a case where the cause of fault exists at the connection portion between the respective circuits in the integrated circuit (LSI) in the failure analysis method according to the first embodiment of the present invention.

FIG. 33 is a failure analysis method for a peripheral device according to a second embodiment of the present invention.

Figure 1:
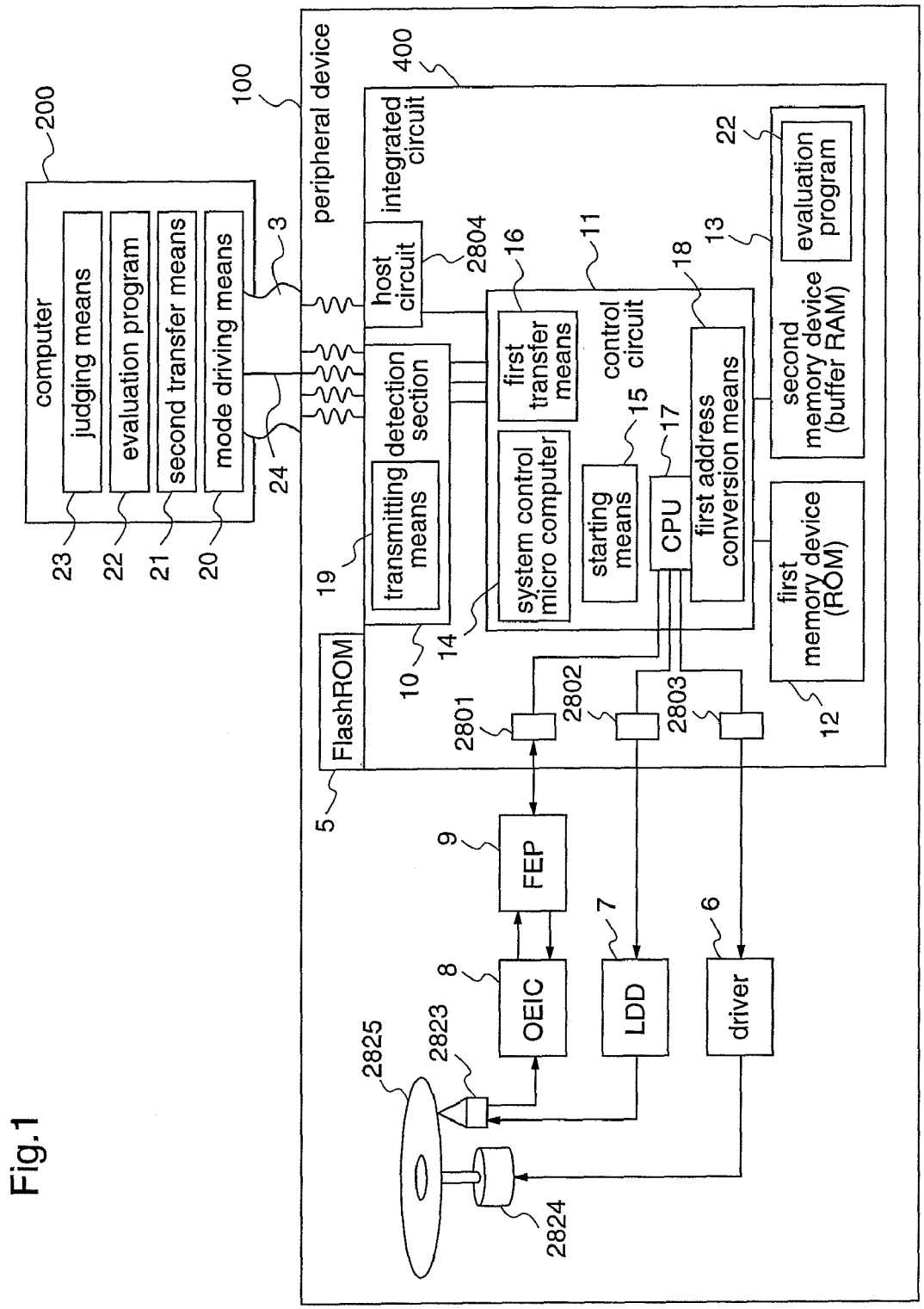
FIG. 1 is a diagram illustrating a construction example of a peripheral device and an integrated circuit for a peripheral device, and a computer which is connected to the peripheral device, according to a first embodiment of the present invention.

DESCRIPTION OF REFERENCE NUMERALS 1, 100, 100a . . . peripheral device
2, 200, 200a . . . computer
3 . . . interface cable
4, 400, 400a . . . integrated circuit
5 . . . Flash ROM
6 . . . driver
7 . . . LDD
8 . . . OEIC
9 . . . FEP
10 . . . detection section
11 . . . control circuit
12 . . . first memory device
13 . . . second memory device
14 . . . system control microcomputer
15, 15a . . . starting means
16 . . . first transfer means
17 . . . CPU
18 . . . address conversion means
19 . . . transmission means
20 . . . mode driving means
21 . . . second transfer means
22 . . . evaluation program
23 . . . judging means
24 . . . signal line
25 . . . test command issuing means
26 . . . command receiving section
27 . . . second address conversion means
28 . . . controller
29 . . . ATAPI circuit
30 . . . decoder
31 . . . mode switching circuit
32 . . . address bus
33 . . . data bus
34 . . . test mode signal
35 . . . control signal line
36 . . . IOCS signal line
37 . . . address bus
38 . . . data bus
39 . . . control signal
40 . . . IOCS16 signal
41 . . . chip select signal
42 . . . address signal
43 . . . data signal
101, 2825 . . . optical disc
102, 2836 . . . optical pickup
301 . . . logic analyzer
302 . . . debugger
303 . . . connector
304 . . . ATA bus monitor
305 . . . probe
320 . . . LSI evaluation board
321 . . . virtual host memory
322 . . . virtual disc memory
323 . . . virtual system computer memory
2801 . . . DRC
2802 . . . analog circuit
2803 . . . servo circuit
2804 . . . host circuit
2805 . . . ECC
2806 . . . dumping resister
2807 to 2824 . . . path
2901 . . . inspection tool

DETAILED DESCRIPTION OF THE INVENTION

Embodiments of the present invention will be described with reference to the drawings.

Embodiment 1

Figure 29:
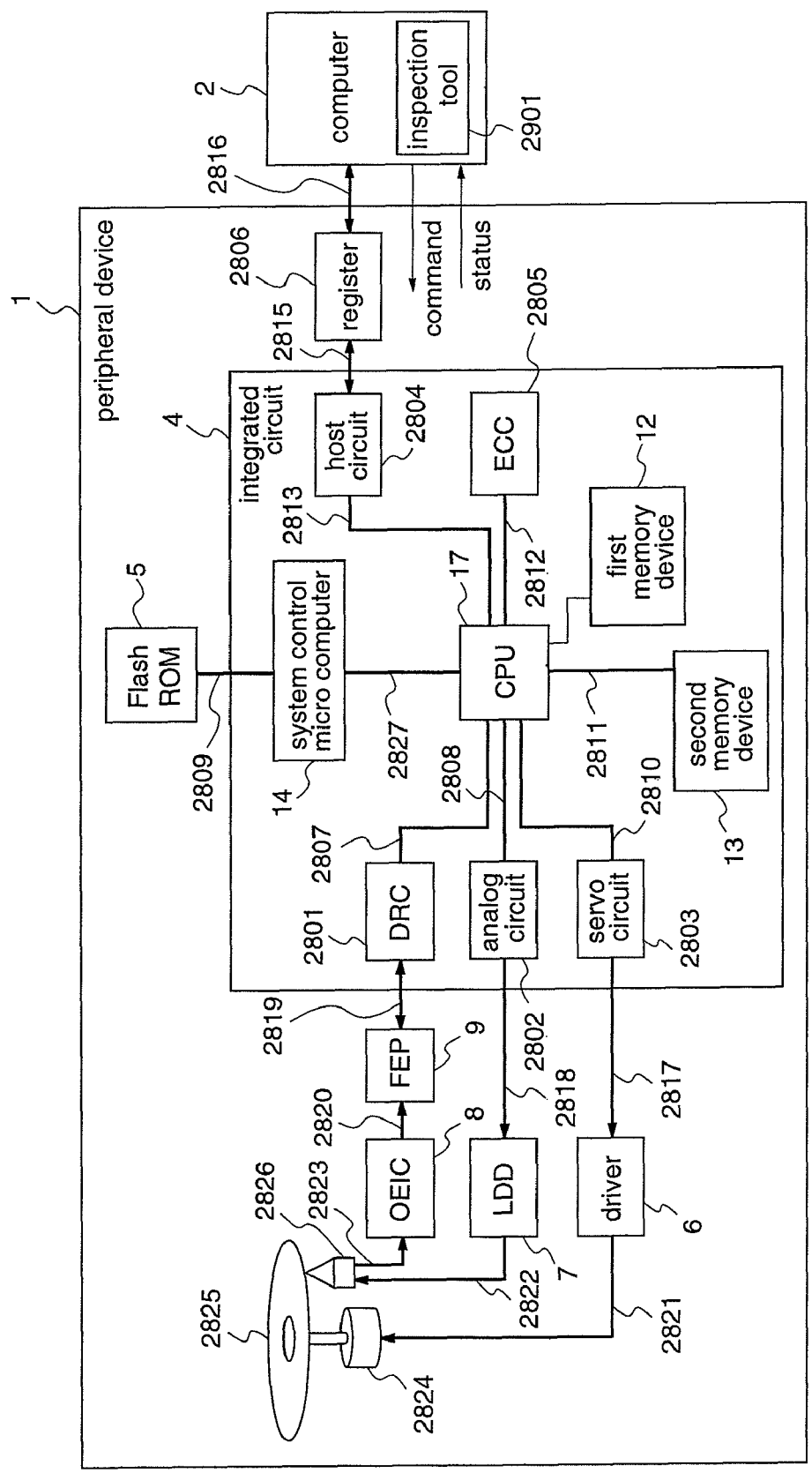
FIG. 29 is a construction diagram of a conventional optical disc device.
Figure 30:
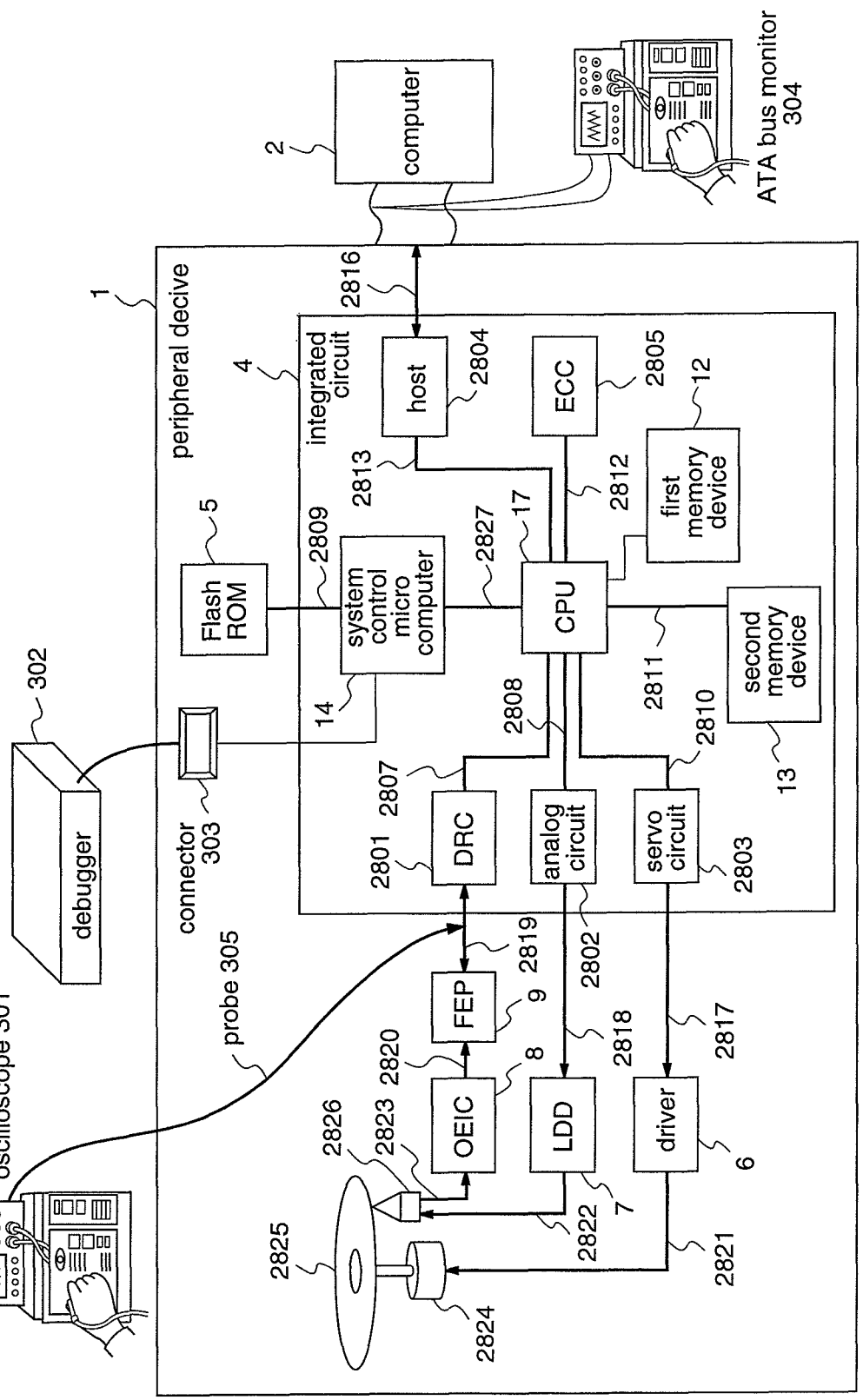
FIG. 30 is a diagram illustrating a construction example of a conventional failure analysis device for an optical disc device.
Figure 31:
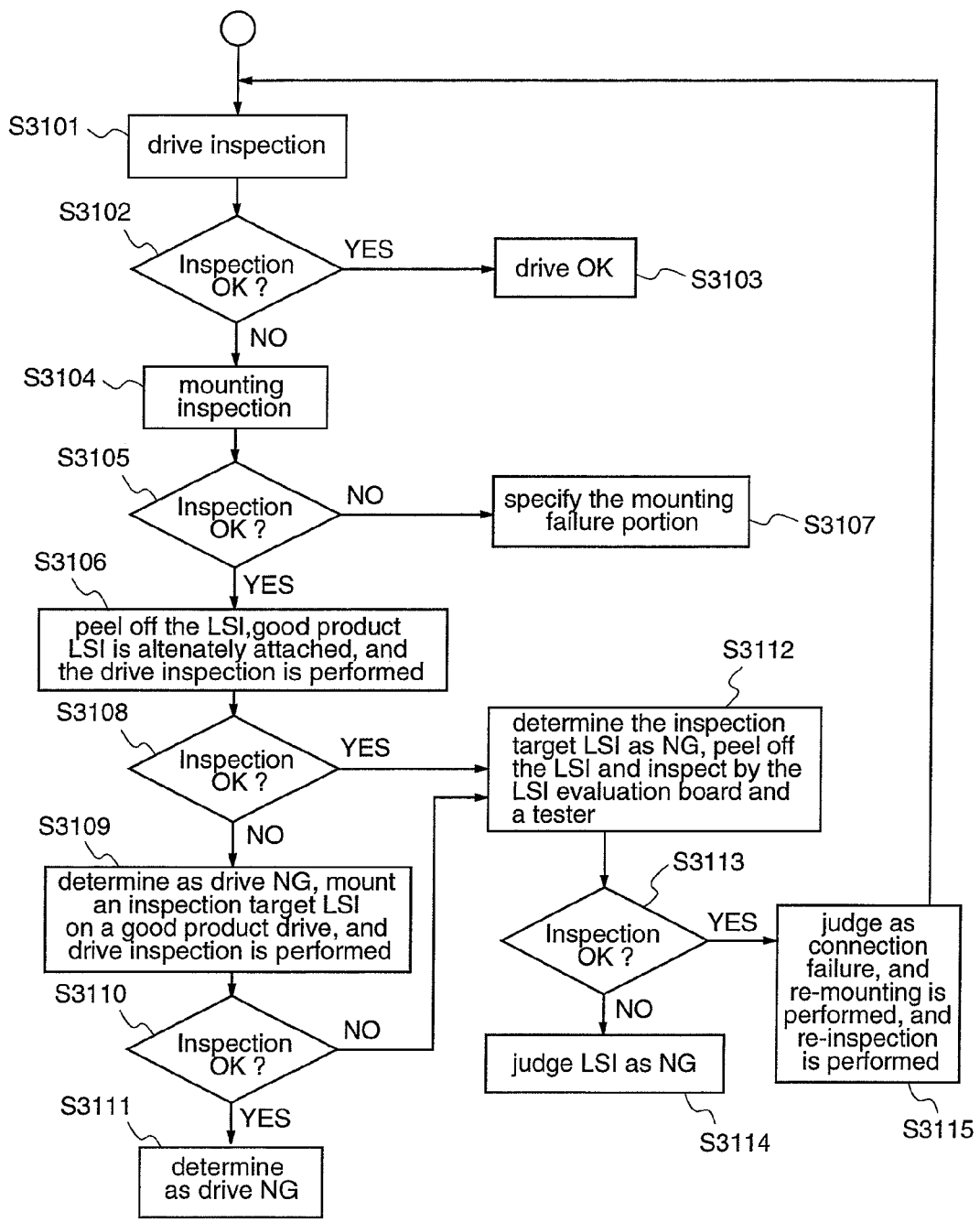
FIG. 31 is a flow diagram illustrating a conventional failure analysis method for an optical disc device.
Figure 32:
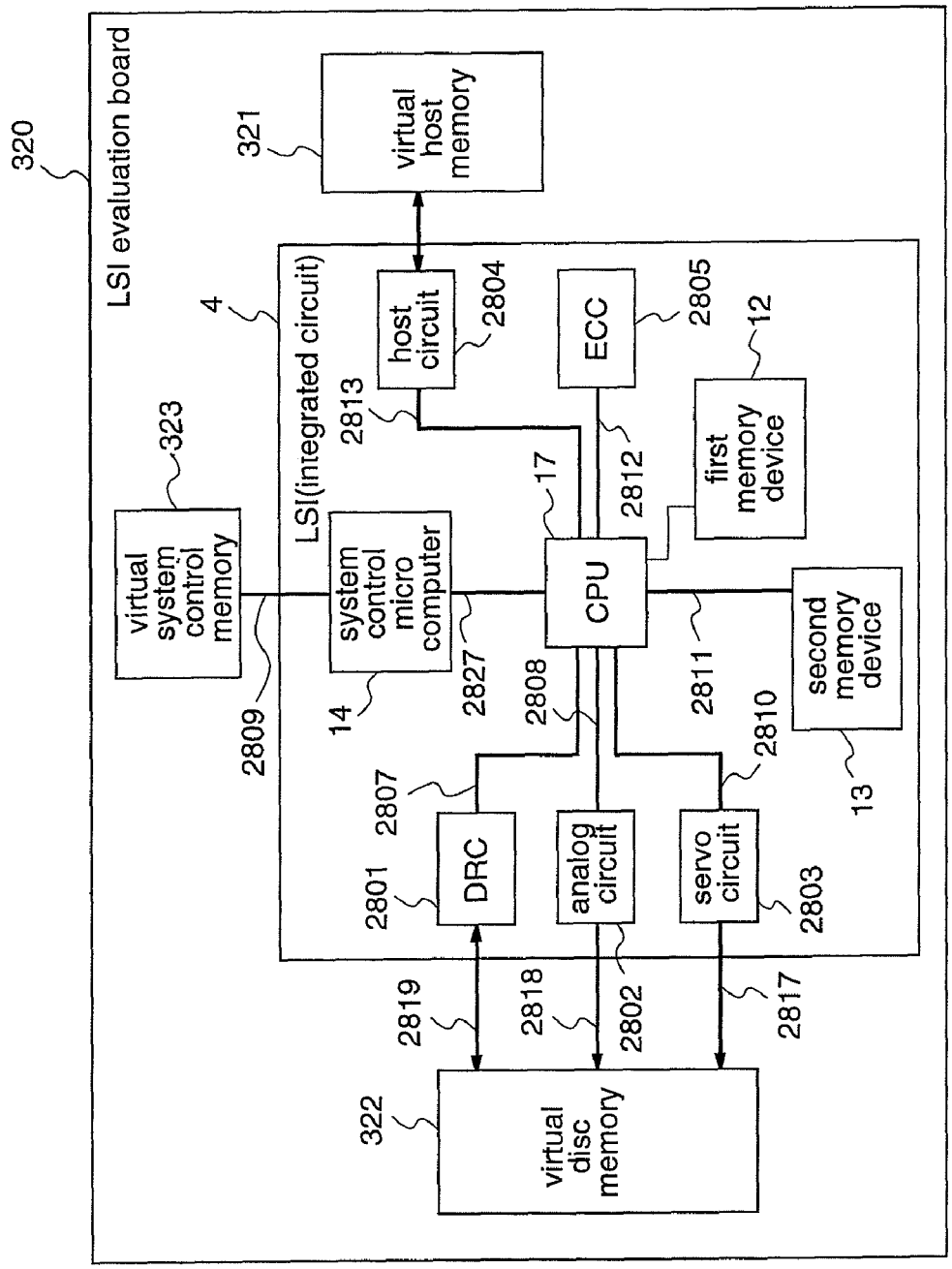
FIG. 32 is a construction diagram illustrating an LSI evaluation board in a conventional art optical disc device.

FIG. 1 is a diagram illustrating a construction example of a peripheral device and an integrated circuit for a peripheral device, and a computer which is connected to the peripheral device according to a first embodiment of the present invention. The same constitutional elements as those in the peripheral device and the integrated circuit as shown in FIG. 29 are designated by the same references, with their explanations omitted.

In FIG. 1, the peripheral device 100 and the computer 200 are connected to each other by an interface cable 3. Here, the interface cable 3 comprises concretely by interface cables such as ATA/ATAPI, SCSI, USB, IEEE1394, and Serial ATA. The interface cable 3 comprises one or more signal lines and one among them is a signal line 24 for transmitting a mode indicating signal which indicates whether the peripheral device 100 is operated in a normal mode or a test mode.

In addition, as the peripheral device 100, an optical disc device such as a DVD player/recorder or a CD player/recorder, a hard disc, a printer, a digital video camera, and a digital video camera, and a scanner are raised. The description here is done with employing an optical disc apparatus as the peripheral device 100.

First of all, the construction of the peripheral device will be described.

The peripheral device 100 is provided with an integrated circuit 400 which controls the peripheral device 100 and a Flash ROM 5 which stores a firmware for controlling the peripheral device 100. In addition, when the peripheral device 100 is an optical disc device, the peripheral device 100 is further provided with a spindle motor 2824 for rotating a disc 2825, a driver 6 for driving a spindle motor 2824, a driver 6 for driving a spindle motor 2824, an optical pickup 2823 which emits a laser light to a disc 2825 and receives its reflected light, an LDD 7 which controls the laser light from the optical pick-up 2823, an OEIC 8 which converts the light signal from the optical pick-up 2823 to an electric signal (digital signal), and an FEP9 which performs a pre-processing of the digital signal which was converted by the OEIC 8.

The integrated circuit 400 is provided with a detection section 10, a control circuit 11, a first memory device 12, and a second memory device 13. The integrated circuit 400 is concretely provided with a system LSI including a CPU 17 and a peripheral circuit. In this LSI, a system control microcomputer 14 may be contained, or it may be externally attached. When the peripheral device 100 is an optical disc device, the integrated circuit 400 is further provided with a DRC 2801, an analogue circuit 2802, and a servo circuit 2803.

The detection section 10 detects whether the mode indicating signal which is transmitted from the mode driving means 20 in the computer 200 through the signal line 24 comprising the interface cable 3 indicates the normal mode or the test mode.

The control circuit 11 is provided with the system control microcomputer 14, the starting means 15, the first transfer means 16, the CPU 17, and the address conversion means 18, and controls the integrated circuit 400.

The first memory device 12 is a ROM memory which stores a program for the normal mode, and stores such as a microcode for controlling the integrated circuit 400 therein.

The second memory device 13 is a buffer RAM which temporarily stores the data which is transmitted and/or received via the control circuit 11, and this stores the evaluation program 22 for the peripheral device 100 and for the integrated circuit 400.

The system control microcomputer 14 controls the integrated circuit 400 for the peripheral device 100 and the peripheral ICs by a firmware which is stored in the Flash ROM 5. For example, when the peripheral device 100 is an optical disc device, the integrated circuit 400 for an optical disc apparatus, a driver 6, and an LDD 7, and an FEP 9 are controlled.

The starting means 15 starts a normal program on the first memory device 12 when the mode indicating signal indicates the normal mode. On the other hand, when a mode indicating signal indicating the test mode is transmitted from the computer 200 and the integrated circuit 400 is made transit to the test mode, it resets the program being executed and starts the evaluation program 22 which was transmitted from the computer 200 and is stored in the second memory device 13.

The first transfer means 16 receives the evaluation program 22 from the computer 200 and transfers same to the second memory device 13.

The CPU 17 is a central processing unit which executes the microcode which controls the integrated circuit 400.

The first address conversion means 18 switches the address at which the CPU 17 addresses the memory device from the first memory device 12 to the second memory device 13 when the detection section 10 detects being in the test mode. Thereby, while the CPU 17 is accessing the first memory device 12 for obtaining instructions at the normal mode, the CPU 17 will access the second memory device 13 for obtaining instructions at the test mode.

The transmission means 19 is included in the detection section 10, and when it is detected that a mode indicating signal, which is transmitted from the computer 200, indicates the test mode signal, the status indicating that a signal indicating the test mode is received is transmitted to the computer 200. When the peripheral device 100 transmits the status to the computer 200, the system control microcomputer 14 writes the value into the ASTA register shown in FIG. 22. Thereby, an interruption is generated in the computer 200, and the computer 200 reads out the Status register shown in FIG. 21.

Next, the construction of the computer 200 will be described.

The computer 200 is provided with the mode driving means 20, the second transfer means 21, the evaluation program 22, and the judging means 23.

The mode driving means 20 transmits a mode indicating signal indicating the test mode to the peripheral device 100 to make the peripheral device 100 at the test mode.

The second transfer means 21 transfers the evaluation program 22 for evaluating the peripheral device 100 and the integrated circuit 400 to the peripheral device 100 at the test mode.

The judging means 23 starts the evaluation program 22 when the status is received from the peripheral device 100, while judges as connection failure when it does not receive the status.

Figure 3:
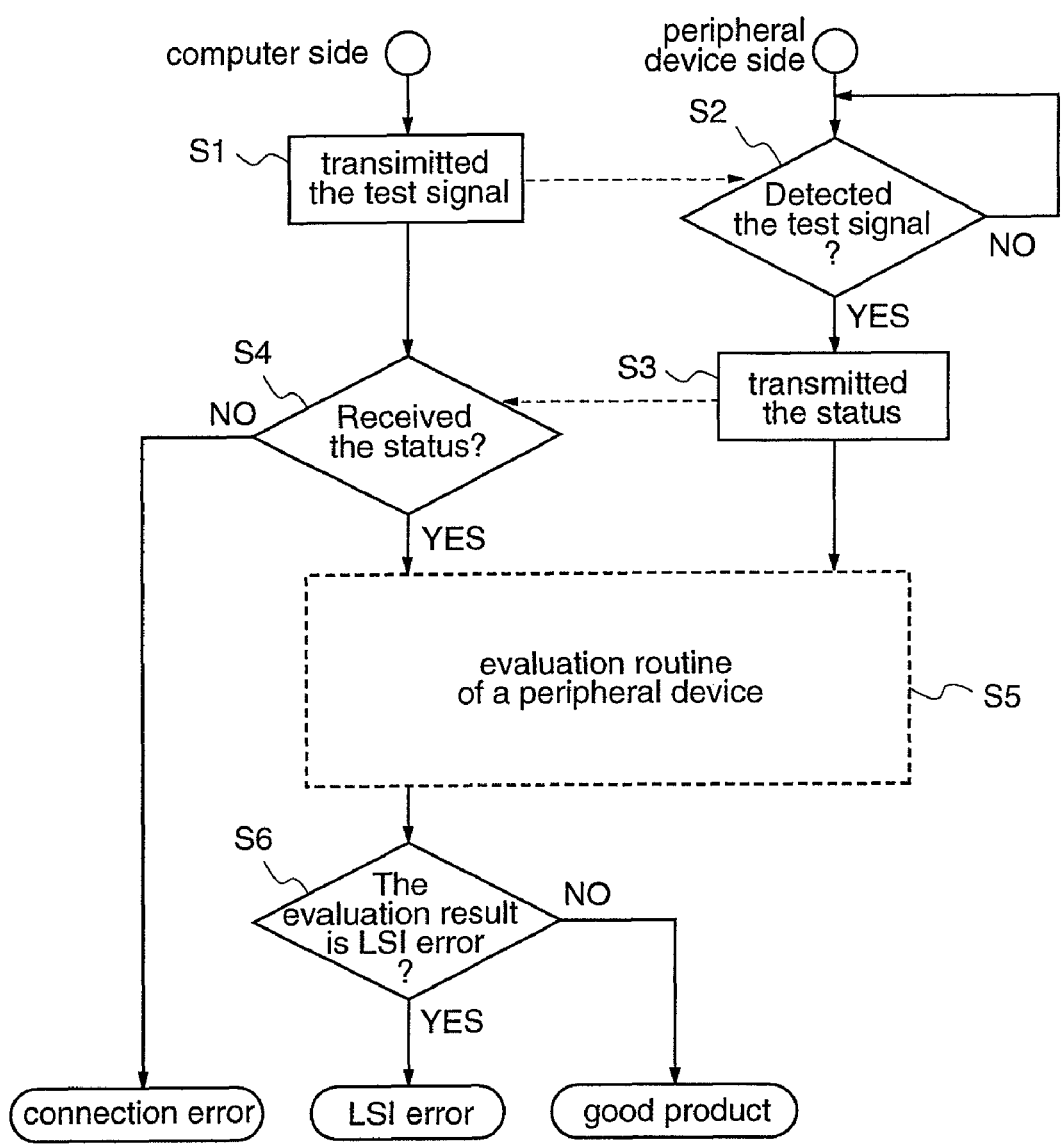
FIG. 3 is a flow diagram illustrating a failure analysis method of a peripheral device, according to a first embodiment of the present invention.

Next, the peripheral device 100, and the method for analyzing the peripheral device 100 and the integrated circuit 400 by the computer 200, will be described with reference to FIG. 3.

step S1: The mode driving means 20 in the computer 200 transmits a mode indicating signal indicating the test mode, and the computer 200 enters the state of waiting the status reception.

step S2: The detection section in the peripheral device 100 detects that the mode indicating signal shows the test mode, and the processing transits to the step S3.

step S3: the transmission means 19 in the peripheral device 100 transmits the status to the computer 200. More concretely, the value indicating the reception of the mode indicating signal indicating the test mode is written into the ATAPI data register (ADAT register) or the status register (ASTA register) as shown in FIG. 22.

step S4: the judging means 23 in the computer 200 judges whether the status is received from the peripheral device 100, and if the status is not received, it is judges as the connection failure.

step S5: the judging means 23 starts an evaluation routine for the peripheral device in the evaluation program 22 when it is judged as the status is received in step S4. The evaluation routine for the peripheral device will be described later.

step S6: the computer 200 starts the evaluation routine for the peripheral device, and it is judged as an LSI error when the value of the evaluation result which indicates the failure of the integrated circuit (LSI) is received from the peripheral device 100, while it is judged as good product when it is not the case.

Next, the detail of the evaluation routine for the peripheral device shown in FIG. 3 will be described. In the first embodiment, there are two evaluation routines for the peripheral device.

Figure 4:
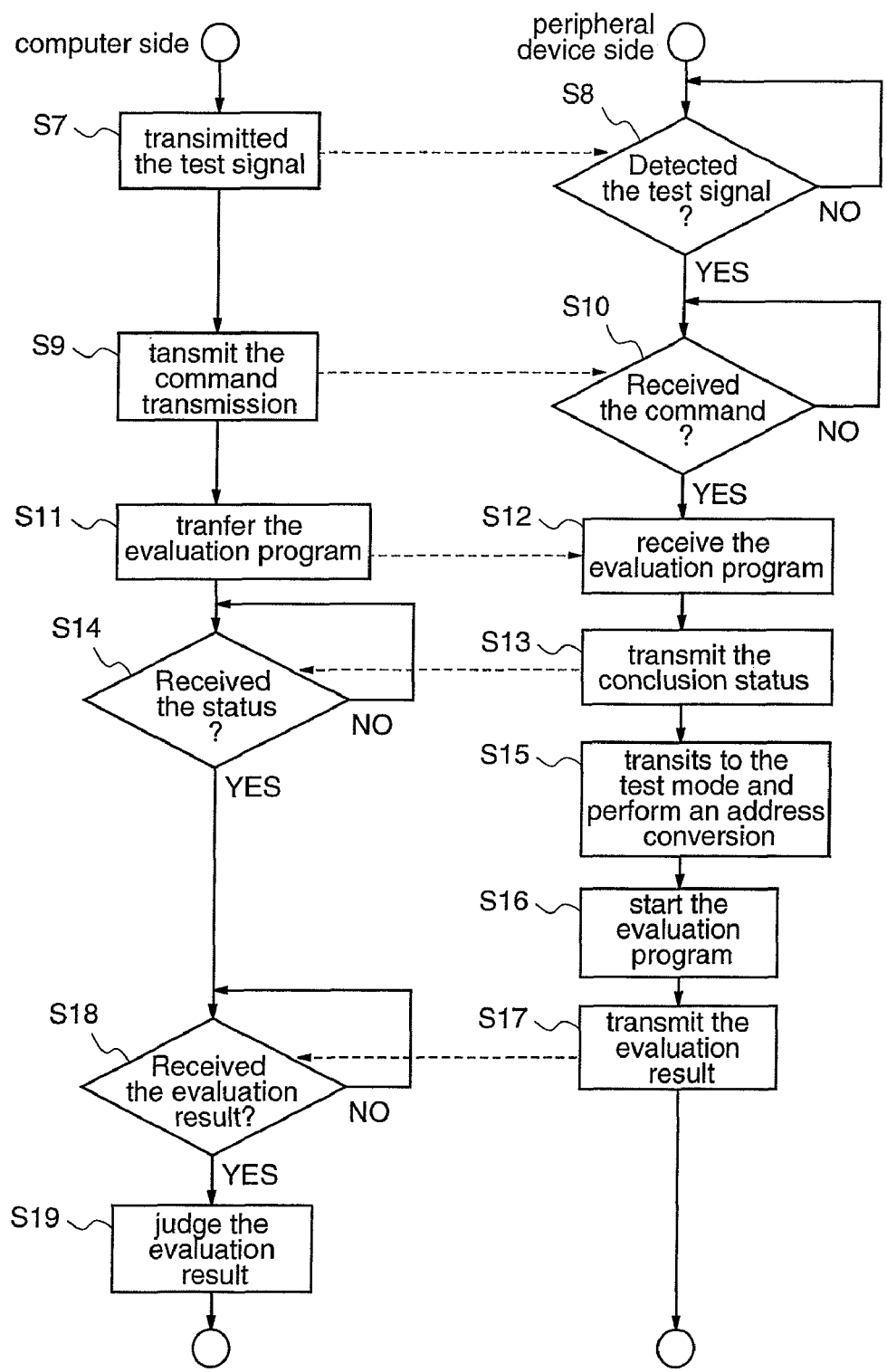
FIG. 4 is a flow diagram illustrating a first peripheral device evaluation routine in the failure analysis method of a peripheral device, according to the first embodiment of the present invention.

FIG. 4 is a flow diagram for illustrating the first evaluation routine for the peripheral device 100.

step S7: the mode drive means 20 in the computer 200 transmits the mode indicating signal indicating the test mode.

step S8: the detection section 10 in the peripheral device 100 detects that the mode indicating signal indicates the test mode.

step S9: the second transfer means 21 in the computer 200 transmits the data transfer command to the peripheral device 100. More concretely, the Write system command in the ATA/ATAPI commands is transmitted.

step S10: the peripheral device 100 receives the data transfer command which is transmitted from the computer 200.

step S11: the second transfer means 21 in the computer 200 transfers the evaluation program 22 to the peripheral device 100.

step S12: the first transfer means 16 in the peripheral device 100 receives the evaluation program which is transmitted from the computer 200, and transfers same to the second memory device 13.

step S13: the peripheral device 100 transmits a conclusion status to the computer 200. More concretely, the peripheral device 100 writes a value such as 0x00 into the ASTA register shown in FIG. 22, and the computer 200 reads out it from the Status register shown in FIG. 21.

step S14: the computer 200 receives the conclusion status and the processing transits to the evaluation result waiting state.

step S15: the address conversion means 18 in the peripheral device 100 transits to the test mode. Thereby, the address that is accessed by the CPU 17 is switched from the first memory device 12 to the second memory device 13.

step S16: the starting means 15 in the peripheral device 100 resets the program being executed and starts the evaluation program 22.

step S17: the states of the peripheral device 100 and the integrated circuit 400 are evaluated by the evaluation program 22, and the transmission means 19 transmits the evaluation result to the computer 200.

step S18: whether the judging means 23 in the computer 200 has received the evaluation result or not is judged.

step S19: the judging means 23, when the evaluation result is received in step S18, starts the evaluation program and judges the evaluation result.

Figure 5:
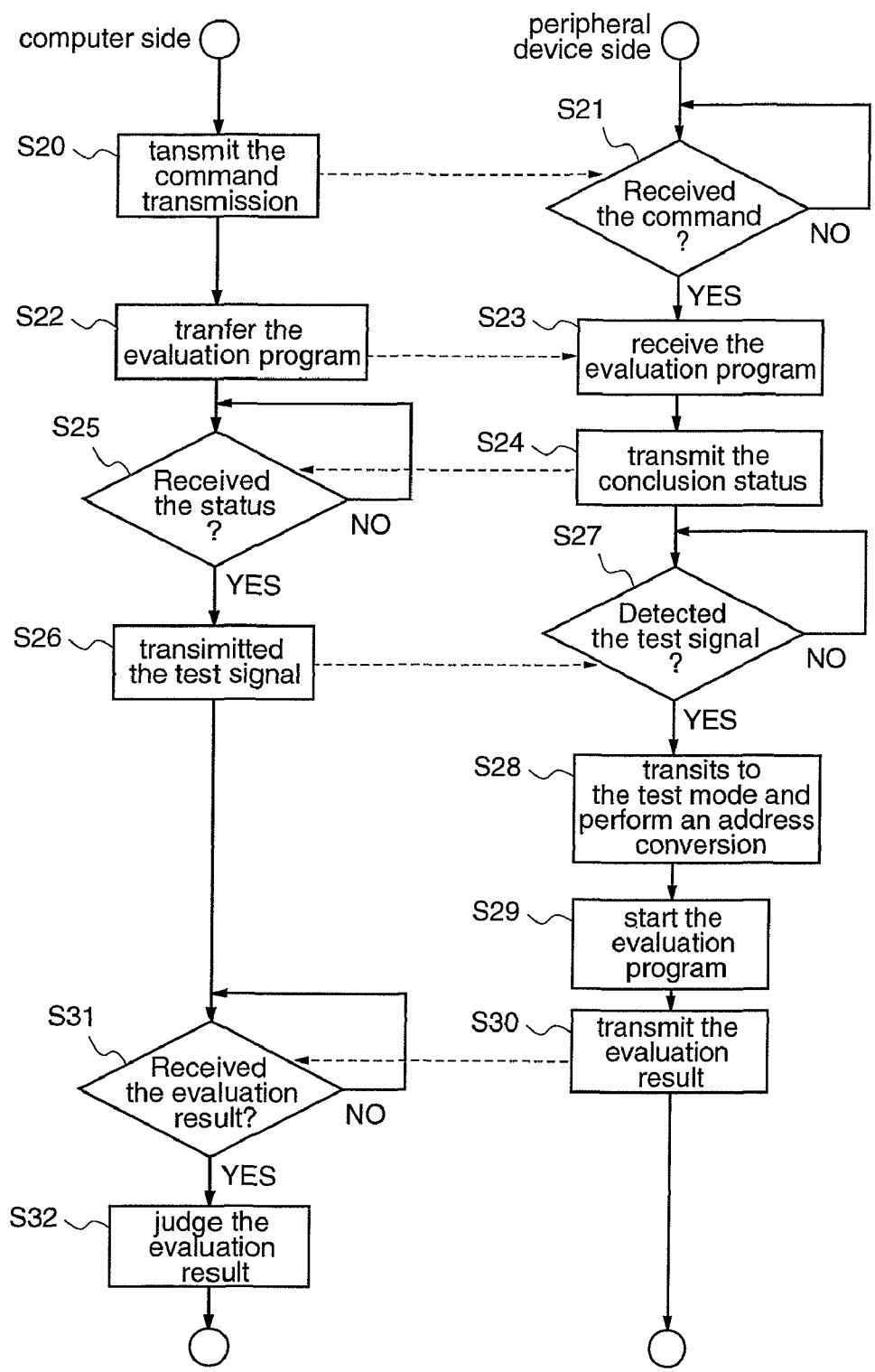
FIG. 5 is a flow diagram illustrating a second peripheral device evaluation routine in the failure analysis method of a peripheral device, according to the first embodiment of the present invention.

Subsequently, the second evaluation routine for the peripheral device 100 will be described. FIG. 5 is a flow diagram illustrating the second evaluation routine.

step S20: the second transfer means 21 in the computer 200 transmits a data transfer command to the peripheral device 100. More concretely, the Write system command in the ATA/ATAPI commands is transmitted.

step S21: the peripheral device 100 receives the data transfer command transmitted from the computer 200.

step S22: the second transfer means 21 in the computer 200 transmits the evaluation program 22 to the peripheral device 100.

step S23: the first transfer means 16 in the peripheral device 100 receives the evaluation program 22 transmitted from the computer 200 and transmits it to the second memory device 13.

step S24: the peripheral device 100 transmits the conclusion status to the computer 200.

step S25: the computer 200 receives the conclusion status.

step S26: the mode drive means 20 in the computer 200 transmits a mode indicating signal indicating the test mode and the computer 200 transits to the state of waiting reception of the evaluation result.

step S27: the detection section 10 in the peripheral device 100 detects that the mode indicating signal indicates the test mode.

step S28: the address conversion means 18 in the peripheral device 100 transits to the test mode. Thereby, the address that is accessed by the CPU 17 is switched from the first memory device 12 to the second memory device 13.

step S29: the starting means 15 in the peripheral device 100 resets the program being executed and starts the evaluation program 22 stored in the second memory device 13.

step S30: the evaluation program 22 evaluates the states of the peripheral device 100 and the integrated circuit 400, and the transmission means 19 transmits the evaluation result to the computer 200.

step S31: the judging means 23 in the computer 200 receives the evaluation result and performs a judgment.

step S32: the judging means 23 starts, when the evaluation result is received in step S31, starts the evaluation program 22 and judges the evaluation result.

Next, a concrete method in which the mode drive means 20 transmits the mode indicating signal indicating the test mode to the peripheral device 100 and makes the peripheral device 100 to the test mode will be described with reference to FIG. 9.

Figure 9:
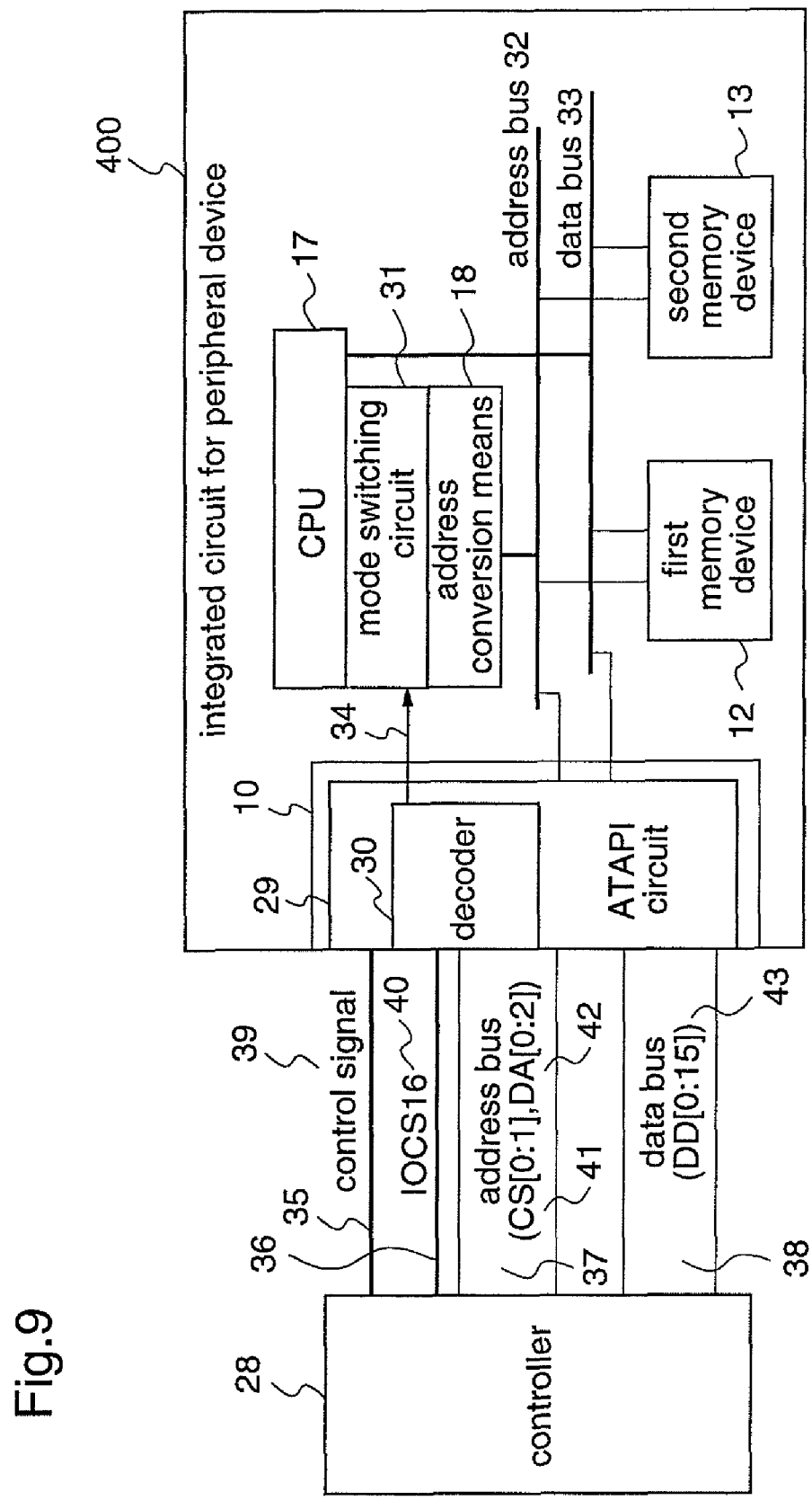
FIG. 9 is a diagram illustrating the connection state between the peripheral device and the computer, and the connection states between the CPU and the first memory device or the second memory device, respectively, in the first embodiment of the present invention.

FIG. 9 is a diagram illustrating the connection state between the peripheral device 100 and the computer 200, the connection states between the peripheral device 100, and the first memory device 12 and the second memory device 13, respectively. FIG. 9 shows a case where the peripheral device 100 and the computer 200 are connected through ATA/ATAPI bus.

In FIG. 9, the controller 28 is a host controller of the computer 200 or the controller 200, and it is connected with the peripheral device 100 via an interface cable 3 so as to perform data communication with the peripheral device 100.

Since the peripheral interface apparatus 100 is connected to the controller 28 with ATA/ATAPI buses, the integrated circuit 400 is provided with a detection section 10 having an ATAPI (Attachment Packet Interface) circuit 29 and a mode switching circuit 31. The ATAPI circuit 29 which is a circuit that is in accordance with the ATAPI standards which specify a data transfer system for connecting a peripheral device to a personal computer, includes a decoder 30. The decoder 30 interprets the control signal that is transmitted from the controller 28 and controls the mode switching circuit 31. When the decoder 30 interprets the control signal that is transmitted from the controller 28 and detects that the mode indicating signal indicates the test mode, the test mode signal 34 which is turned to be ON state is outputted. The switching circuit 31 switches, when the test mode signal 34 which was outputted from the decoder 30 is in ON state, the address conversion means 18 to the test mode. Thereby, the access from the CPU 17 to the first memory device 12 is switched to the access from the CPU 17 to the second memory device 13. The CPU 17 inputs/outputs data with the first memory device 12, the second memory device 13, or the ATAPI circuit 29 via the data bus 33.

The controller 28 and the ATAPI circuit 29 in the integrated circuit 400 are connected with each other via the control signal line 35, IOCS (input-output control system) signal line 36, the address bus 37, and the data bus 38.

The control signal 39 which is transmitted/received via the control signal line 35 is a control signal such as DIOW, DIOR, DMARQ, and DMACK in the ATA standards, and these are signals for controlling the data transmission/reception. The signal which is transmitted/received through the IOCS signal line 36 is an IOCS16 signal 40, which has been used before the ATA-2 standards is created, but is now abolished. The signals which are transmitted/received via the address bus 37 are the chip select signal 41(CS[0:1] (=CS0, CS1) in the ATA standards, and the address signal 42 (DA[0:2] (=DA0, DA1, DA2) in the ATA standards. The data bus 38 is a data bus DD of 8 bits or 16 bits in the ATA standards.

The concrete operation of the controller 28 and the decoder 30 will be described.

The controller 28 transmits the chip select signal 41 (CS0, CS1) on the ATA/ATAPI bus, the address signal 42 (DA0, DA1, DA2), and the data signal 43 (DD[0:15]), and the decoder 30 decodes these signals and outputs the test mode signal 34 which is made in ON state to the mode switching circuit 31.

As methods for the decoder 30 to make the test mode signal 34 in ON state, there are following three methods.

EXAMPLE 1

Figure 10:
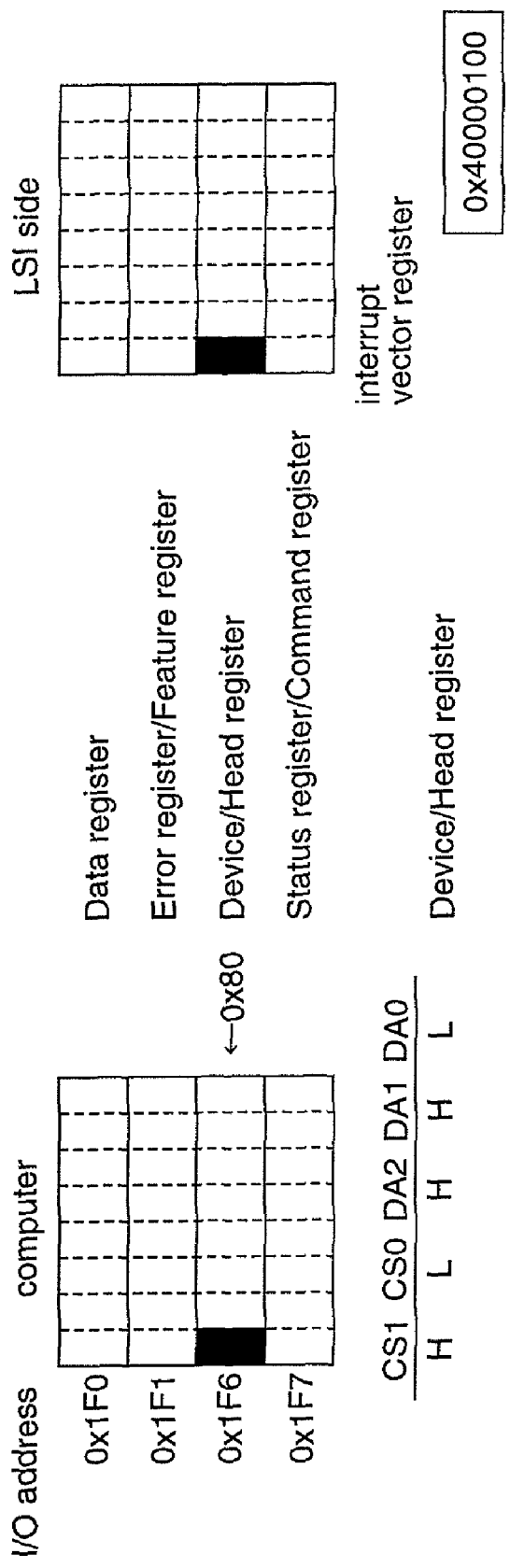
FIG. 10 is a diagram for illustrating the operation of a decoder in the peripheral device according to the first embodiment of the present invention.

In the first method, as shown in FIG. 10, the bit which is not assigned to the ATA register in the ATA standards is employed as shown in FIG. 10. For example, the seventh bit obs of the Device/Head register, which is an abolished bit, is utilized. That is, when the chip select signal 41 is made one indicating the Device/Head register, address signal 42 are made CS0=Low, CS1=High, data signals are made as DA0=Low, DA1=DA2=High, 0b1xxxxxxx is written into the 7-th bit of the Device/Head register of ATA, that the signal of DD7=1 is driven is decoded and the test mode signal 34 is turned on in ON state to be outputted to the mode switching circuit 31.

EXAMPLE 2

In the second method, as shown in FIG. 11, when the register in the abolished region is employed in the address assignment for the ARTA register in the ATA standards, it is made such that CS0=Low, CS1=Low, DA0=DA1=DA2=High, and 0x01 is written into the data register of ATA, that the signal of DD0=1 and the signals of DD1 to DD15=0 are driven is decoded and the test mode signal 34 is turned on in ON state to be outputted to the mode switching circuit 31.

EXAMPLE 3

In the third method, when the IOCS16 signal 40 of the ATA/ATAPI bus shown in FIG. 9 is high, the test mode signal 34 being turned on in ON state is outputted to the mode switching circuit 31.

When the decoder 30 makes the test mode signal 34 in ON state, the mode switching circuit 31 switches the first address conversion means 18 to the test mode, and the address that is accessed by the CPU 17 is switched from the first memory device 12 to the second memory device 13.

Hereinafter, this address switching operation will be described with reference to FIG. 12.

Figure 12A:
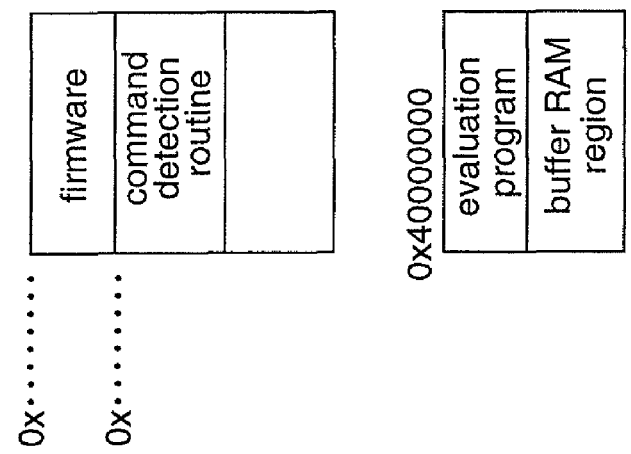
FIG. 12 is a diagram illustrating an address map which is accessed by a CPU in the peripheral device according to the first embodiment of the present invention.
Figure 12B:
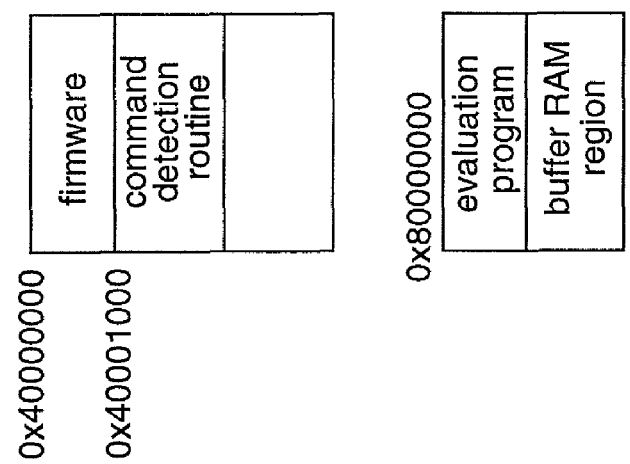
Figure 12C:
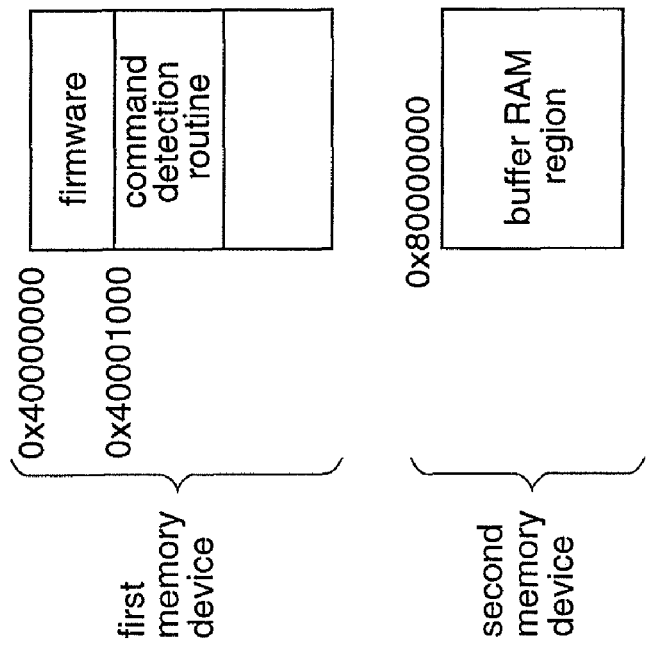

First of all, in the normal mode operation, the decoder 30 outputs the test mode signal 34 of OFF state to the mode switching circuit 31, and the address map that is accessed by the CPU 17 then becomes as shown in FIG. 12(*a*). In FIG. 12(*a*), since the address 0x40000000 is disposed in the first memory device 12, the CPU 17 accesses from the address 0x40000000 and the CPU 17 starts the microcode on the first memory device 12.

Next, in the test mode, the evaluation program 22 is transmitted from the second transfer means 21 in the computer 200, and the transmitted evaluation program 22 is transferred to the second memory device 13 by the first transfer means 16 in the integrated circuit 400. The address map accessed by the CPU 17 then is as shown in FIG. 12(*b*). In other words, the evaluation program 22 is disposed at the top of the address 0x80000000.

Next, the decoder 30 outputs the test mode signal 34 of ON state to the mode switching circuit 31, and the address map accessed by the CPU 17 becomes as shown in FIG. 12(*c*). Since the address 0x40000000 is disposed in the second memory device 13 as shown in FIG. 12(*c*), the CPU 17 would access from the address 0x40000000, and since the evaluation program 22 is previously transferred to the second memory device 13, the CPU 17 can start the evaluation program 22 on the second memory device 13. In the test mode, this evaluation program 22 is started, and the evaluation of the peripheral device 100 is performed.

Next, the concrete operation of the evaluation program 22 will be described.

Figure 13:
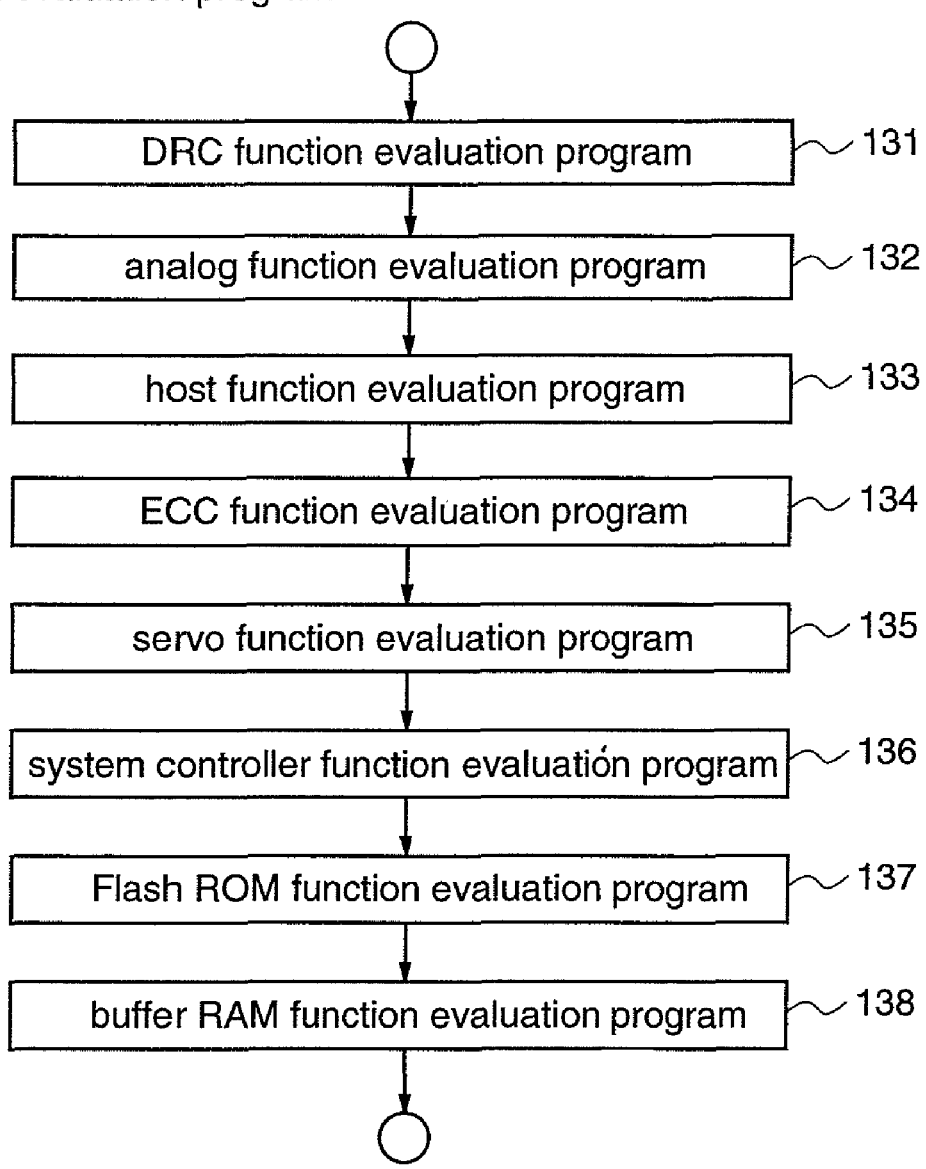
FIG. 13 is a diagram for illustrating an LSI evaluation program which is used in the failure analysis method of the peripheral device according to the first embodiment of the present invention.

Among the evaluation program 22, there are an LSI evaluation program for evaluating failure of the integrated circuit (LSI) shown in FIG. 13, and a drive evaluation program for evaluating failure of the optical disk device ("drive") shown in FIG. 14.

First of all, the LSI evaluation program shown in FIG. 13 will be described.

The LSI evaluation program is constituted by programs for evaluating the respective functions of the LSI, and it includes the DRC function evaluation program 131, the analog function evaluation program 132, the ECC function evaluation program 134, the servo function evaluation program 135, the system control microcomputer function evaluation program 136, the Flash ROM function evaluation program 137, and the buffer RAM function evaluation program 138.

Figure 28:
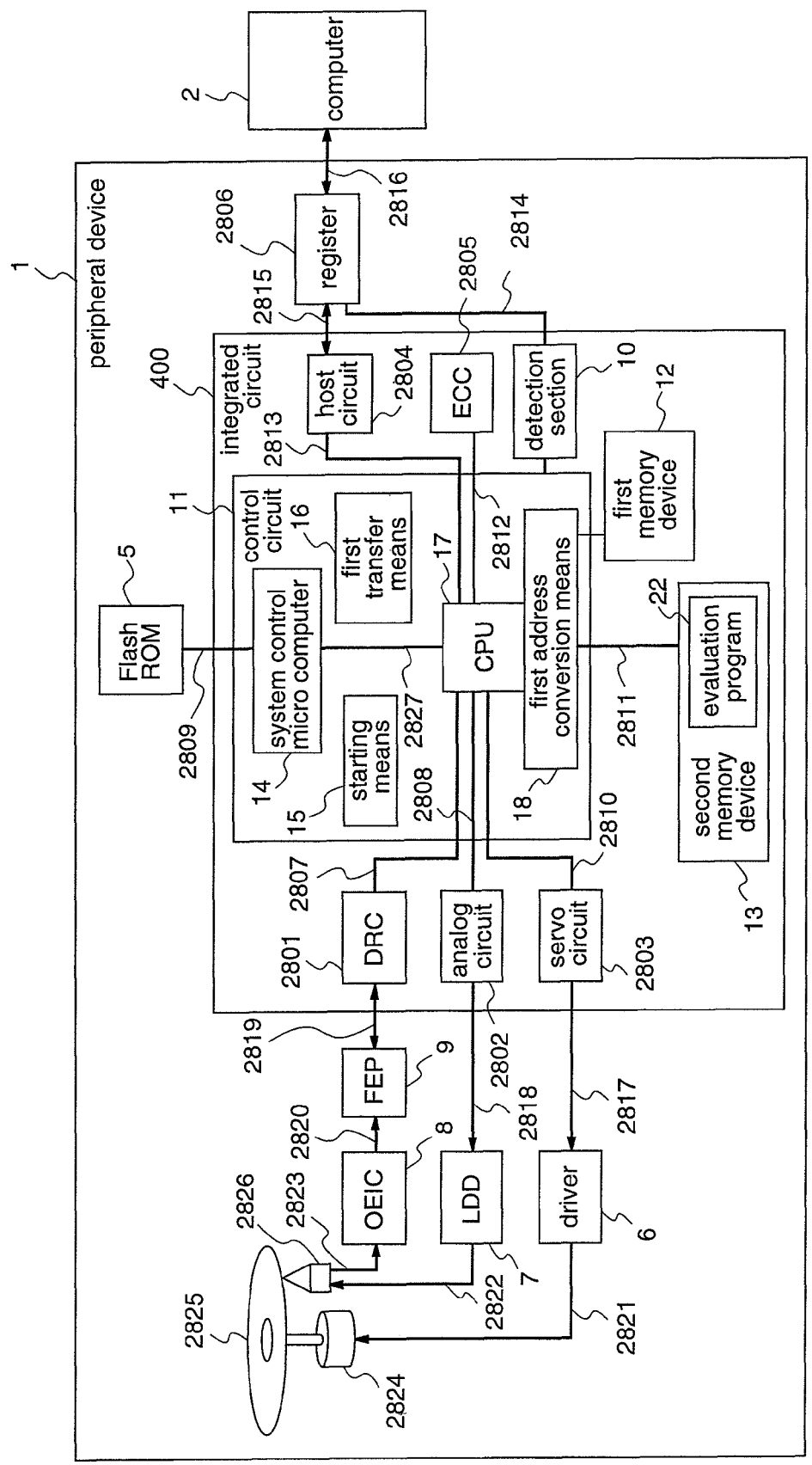
FIG. 28 is a diagram illustrating the evaluation paths in the peripheral device according to the first embodiment of the present invention.

These programs are programs which respectively evaluates the respective circuits and their paths in the integrated circuit 400 shown in FIG. 28.

The DRC function evaluation program 131 evaluates the DRC circuit 2801 and the path 2807, the analog function evaluation program 132 evaluates the analog circuit 2802 and the path 2808, the host function evaluation program 133 evaluates the host circuit 2804 and path the 2813, the ECC function evaluation program 134 evaluates the ECC circuit 2805 and the path 2812, the servo function evaluation program 135 evaluates the servo circuit 2803 and the path 2810, the system control function evaluation program 136 evaluates the system control microcomputer 14 and the path 2827, the Flash ROM function evaluation program 136 evaluates the Flash ROM 5 and the path 2809, and the buffer RAM function evaluation program 138 evaluates the second memory device 13 and the path 2811.

Figure 15:
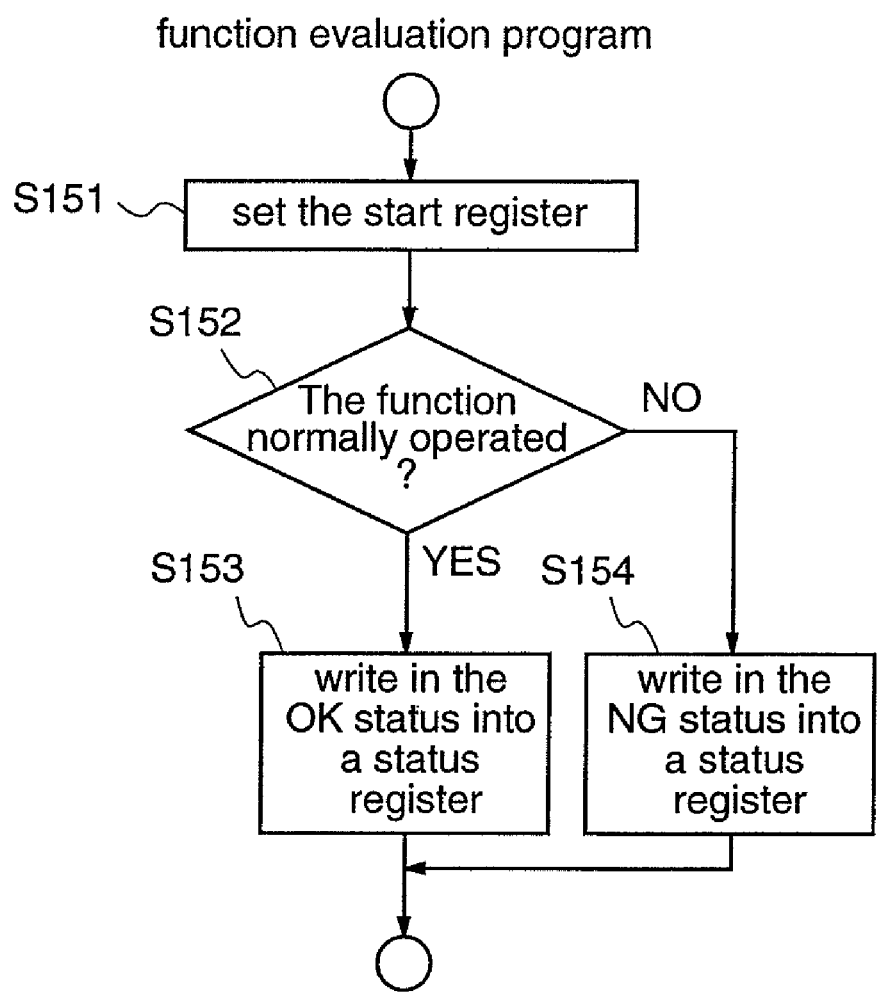
FIG. 15 is a flow diagram illustrating the function evaluation program shown in FIG. 13.

The processing of the respective function evaluation programs will be described with reference to the flow diagram shown in FIG. 15.

step S151: set the start register.

step S152: judge whether the function is normally operated or abnormally operated.

step S153: when the function is normally operated, the OK status is written in into the result register.

step S154: when the function is abnormally operated, the NG status is written in into the result register.

The above-described writing steps will be described with reference to FIG. 16.

FIG. 16 is an address map of the integrated circuit 400 of the peripheral device. In FIG. 16, 0x40000000 to offset 0xFFFF indicates a buffer ROM region. 0x80000000 to 0xFFFFF indicates a buffer RAM region. From 0x88000000 are a register region, and 0x88000010 indicates a system control register indicating that the set value for starting the system control microcomputer is 0x10. When the system control microcomputer is started, if it is normally operated, 0x10 is written in into the system control microcomputer register, and if it is abnormally operated, 0xFF is written in into the system control microcomputer result register. 0x88000020 indicates the DRC start register and shows that the set value for starting the DRC is 0x10. If the DRC is normally operated when the DRC is started, 0x10 is written in into the DRC result register, and if it is abnormally operated, 0xFF is written in into the DRC result register. Similarly, 0x88000030 is an analog start register indicating that the set value for starting the analogue circuit is 0x10. When the analogue circuit is started, if the analog circuit is normally operated, 0x10 is written in into the analogue result register, and if it is abnormally operated, 0xFF is written in into the analog result register. As for the servo circuit, the host circuit, and the ECC, the same does apply.

The concrete processing of the system control microcomputer evaluation program and the DRC function evaluation program will be described with reference to the flow diagram of FIG. 15. Here, the value indicating the OK status is assumed as 0x10, and the value indicating the NG status is assumed as 0xFF.

(1510) In step S151, 0x10 is written in into the system control microcomputer register 0x88000010.

(1511) In step S152, whether the system control microcomputer function is operated normally or abnormally is judged.

(1512) If the judgment result in the step S152 is normal operation, the OK status 0x10 is written in into the system control microcomputer result register 0x88000018. Similarly, the evaluation of the DRC function is performed in the following sequences.

(1521) In step S151, 0x10 is written in into the DRC register 0x88000010.

(1522) In step S152, it is judged whether the DRC function is operated normally or abnormally.

(1523) If the judgment result in the step S152 is normal operation, the OK status 0x10 is written in into the DRC result register 0x88000028 in step S153.

(1524) If the judgment result of step S152 is abnormal operation, the NG status 0xFF is written in into the DRC result register 0x88000028 in step S154.

The analogue function evaluation program 132, the host function evaluation program 133, the ECC function evaluation program 134, and the servo function evaluation program 135 similarly set the values to the analogue start register, the host start register, the ECC start register, and the servo start register, respectively, and the value of 0x10 when each function is normally operated or the value of 0xFF when each function is abnormally operated, is written in into the analog result register, the host result register, the ECC result register, and the servo result register, respectively.

After the above-described respective function evaluation programs are operated, the respective function results are stored as shown in FIG. 17. In FIG. 17, since the DRC register, the servo result register, and the ECC result register are made 0xff, it can be judged as there is failure in the DRC function, the servo function, and the ECC function, respectively.

FIG. 18 is a diagram showing the specification of the LSI status register at address 0x88000078. The value of bit 0 of the register shows 1 when the Flash ROM has failure, while it shows 0 when it is OK. The value of bit 1 thereof shows 1 when the buffer RAM has failure, while it shows 0 when it is OK. The value of 4-th bit thereof shows 1 when the disc system path has failure, while it shows 0 when it is OK. The value of 5-th bit thereof shows 1 when the host path has failure, while it shows 0 when it is OK. For example, if the value of the LSI status register at address 0x88000078 is 0x33, since all the bit 0 bit, bit 1, 4-th bit, and 5-th bit are 1, it is indicated that all the Flash ROM, the buffer RAM, the disc system path, and the host path have failure, respectively.

Next, the operations of the Flash ROM evaluation program 137 and the buffer RAM evaluation program 138 will be described with reference to FIGS. 19 and 20, respectively.

Figure 19:
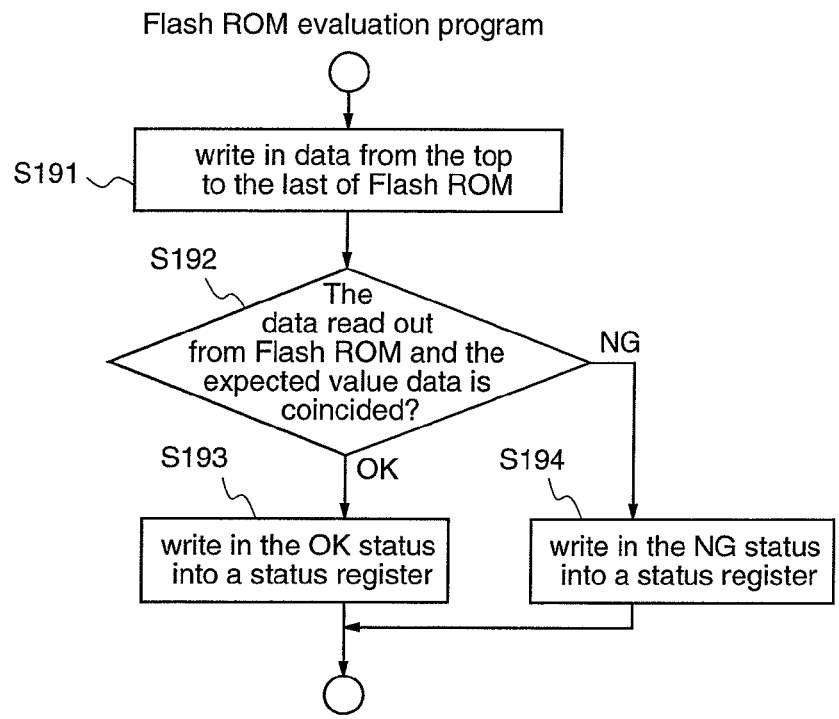
FIG. 19 is flow diagram illustrating the Flash ROM evaluation diagram shown in FIG. 13.

FIG. 19 shows a processing flow of the Flash OM function evaluation program 137.

step S191: data are successively written in from the top to the last of the Flash ROM.

step S192: data are successively read out from the top to the last of the Flash ROM and the read out data is compared with the expected value to judge whether the read out data coincide with the expected data.

step S193: when all the read out data coincide with the expected data, the OK status is written in into the LSI status register. That is, 0 is written in into the bit 0 of the LSI status register at address 0x88000078.

step S194: if even one among all the data which are read out does not coincide with the expected data, the NG status is written in into the LSI status register. That is, 1 is written in into bit 0 of the LSI status register at 0x88000078.

Figure 20:
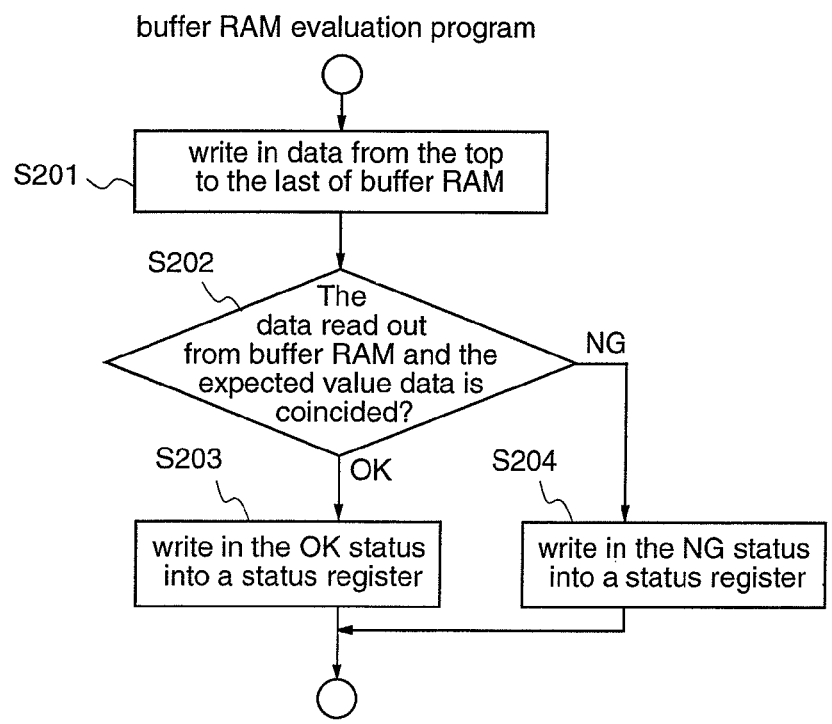
FIG. 20 is a flow diagram illustrating the buffer RAM evaluation diagram shown in FIG. 13.

FIG. 20 shows a processing flow of the buffer RAM evaluation program 138.

step S201: data are successively written in from the top to the last of the buffer RAM.

step S202: data are successively read out from the top to the last of the buffer RAM and the read out data is compared with the expected value to judge whether the read out data coincide with the expected data.

step S203: when all the read out data coincide with the expected data, the OK status is written in into the LSI status register. That is, 0 is written in into the bit 1 of the LSI status register at address 0x88000078.

step S204: if even one among all the data which are read out does not coincide with the expected data, the NG status is written in into the LSI status register. That is, 1 is written in into bit 1 of the LSI status register at address 0x88000078.

Next, the drive evaluation program for verifying whether the drive has failure or not will be described. Here, the drive evaluation program is an evaluation program for a system which covers a plurality of products in the peripheral device 100.

FIG. 14 shows processing flows of the drive evaluation program for verifying the failure of the drive.

FIG. 14(a) is a processing flow illustrating the drive evaluation program for a disc system which verifies the paths between the disc and the system LSI.

The paths which are verified by the drive evaluation program will be described with reference to FIG. 28.

In FIG. 28, the evaluation program for the disk system processing evaluates a route of path 2810→servo circuit 2803→path 2817→driver 6→path 2821→spindle motor 2824, and a route of path 2808→analogue circuit 2802→path 2818→LDD 7→path 2822→optical pickup 2826→path 2823→OEIC 8→path 2820→FEP 9→path 2819 ⇔DRC 2801 ⇔path 2807.

Hereinafter, the processing flow will be explained.

step S1401: the servo function is started by setting 0x10 into the servo start register.

step S1402: the analog function is started by setting 0x10 into the analog start register.

step S1403: the DRC function is started by setting 0x10 in the DRC start register.

step S1404: by that the servo function, the analog function, and the DRC function are started, data are read out from the disc 2825 and are stored in the buffer RAM.

step S1405: the data stored in the buffer RAM and the expected data are compared.

step S1406: when the comparisons between the data stored in the buffer RAM and the expected data show all coincidence, the OK status is written in into the LSI status register. That is, 0 is written in into 4-th bit of the LSI status register at address 0x88000078.

step S1407: if there is in-coincident data in the comparison between the data stored in the buffer RAM and the expected data, the NG status is written in into the LSI status register. That is, 1 is written in into 4-th bit of the LSI status register at address 0x88000078.

FIG. 14(b) is a processing flow illustrating the drive evaluation program which verifies the paths between the computer 200 and the system LSI.

In FIG. 28, the evaluation program for the host system processing evaluates a route of path 2813 ⇔host circuit 2804 ⇔path 2815 ⇔dumping resister 2806 ⇔path 2816.

step S1411: set 0x11 into the host start register to start the host function.

step S1412: set a value into the ATA/ATAPI register to start the ATAPI function step S1413: start the host function and the ATA/ATAPI function to read out data from the computer 200, and store same in the buffer RAM (second memory device 13).

step S1414: compare the data stored in the buffer RAM (second memory device 13) and the expected data.

step S1415: when the comparison between the data stored in the buffer RAM (second memory device 13) and the expected data show all coincidence, the OK status is written in into the LSI status register. That is, 0 is written in into 5-th bit of the LSI status register at address 0x88000078.

step S1416: if there is in-coincident data in the comparison between the data stored in the buffer RAM (second memory device 13) and the expected data, the NG status is written in into the LSI status register. That is, 1 is written in into 5-th bit of the LSI status register at address 0x88000078.

When the LSI evaluation program and the drive evaluation program are operated as described above, the values in the system control microcomputer result register, the DRC result register, the analog result register, the servo result register, the host result register, the ECC result register, and the LSI status register become as shown in FIGS. 17 and 18.

FIG. 21 is a diagram illustrating an address allocation for the ATA register which can be accessed from the computer 200. FIG. 22 is a diagram illustrating an address allocation for the ATA register which can be accessed from a system control microcomputer 14. For example, the value which was written in into the address 0x1F0 from the computer 200 can be read out from the ADTA register at address 0x800000c0 in the system control microcomputer 14. Conversely, the value which was written in into the ADAT register at address 0x80000c0 from the system control microcomputer 14 can be read out from the Data register (address 0x1F0) in the computer 200.

Similarly, the AFEA register in the system control microcomputer corresponds to the Feature register which can be accessed from the computer 20, the AERR register in the system control microcomputer corresponds to the Error register in the computer 200, the AIRR register in the system control microcomputer 14 corresponds to the InterruptReason/SectorCount register in the computer 200, the ASN register in the system control microcomputer 14 corresponds to the SectorNumber register in the computer 200, the ACL register in the system control microcomputer 14 corresponds to the CylinderLow register in the computer 200, the ACH register in the system controller microcomputer 14 corresponds to the CylinderHigh register in the computer 200, the ADH register in the system control microcomputer corresponds to the Device/Head register in the computer 200, the ACOM register in the system control microcomputer 14 corresponds to the Command register in the computer 200, the ASTA register in the system control microcomputer 14 corresponds to the Status register in the computer 200, the ADC register in the system control microcomputer 14 corresponds to the DeviceControl register in the computer 200, and the ALTS register in the system control microcomputer 14 corresponds to the AlternateStatus register in the computer 200, respectively.

The values of these registers shown in FIG. 17 are successively written in into the ASTA register (at address 0x8800007c) of the ATAPI circuit 29 in the integrated circuit 400 successively. As a result, by reading out the Status register continuously from the computer 200, for example, the evaluation result on the ATA/ATAPI protocol becomes as (231) to (237) shown in FIG. 23. (231) shows that the evaluation result on the system control microcomputer is OK, (232) shows the evaluation result on the DRC is NG, (233) shows that the evaluation result on the analog circuit is OK, (234) shows the evaluation result on the servo circuit is NG, (235) shows the evaluation result on the host circuit is OK, (236) shows the evaluation result on the ECC is NG, and (237) shows the disc path is OK, respectively.

Figure 24:
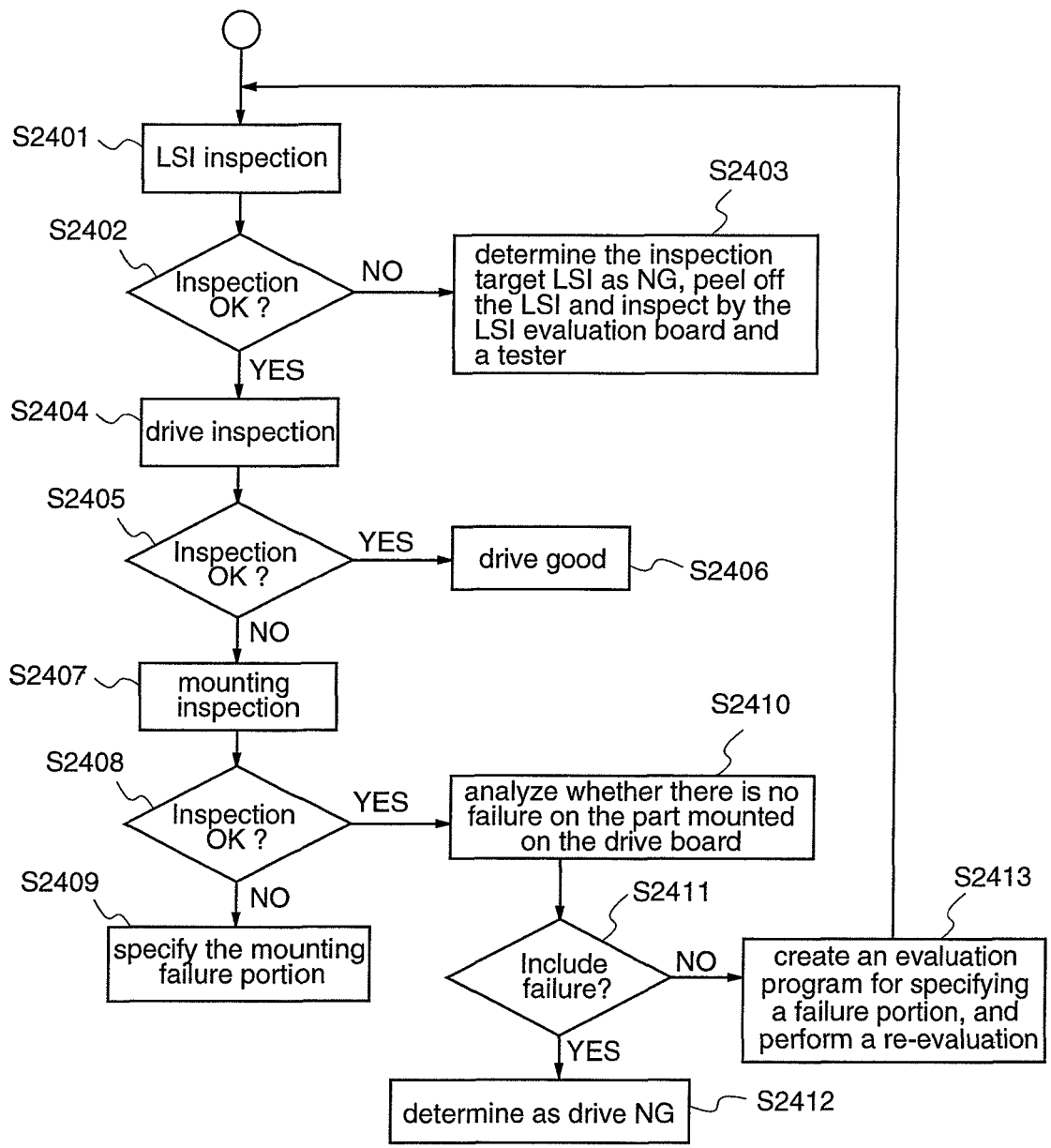
FIG. 24 is a flow diagram illustrating a failure analysis method according to the first embodiment of the present invention.

FIG. 24 is a flow of analyzing failure when the failure is judged. In the description of that flow, the "drive" means the peripheral device (optical disc device), and "LSI" means "integrated circuit".

step S2401: the LSI evaluation program is transferred from the computer 200 to the peripheral device 100 thereby to perform the inspection of the LSI.

step S2402: whether the result of the LSI inspection in step S2401 is OK or NG is judged.

step S2403: if the inspection result in step S2402 is NG, the LSI as the inspection target is determined as NG, and then the LSI is peeled off and the inspection thereof is performed by the LSI evaluation board and the tester.

step S2404: if the inspection result in step S2402 is OK, the drive evaluation program is transferred from the computer 200 to the peripheral device 100, and the drive inspection is performed.

step S2405: whether the result of the drive inspection in step S2404 is OK or NG is judged.

step S2406: if the inspection result in step S2404 is drive OK, the drive is determined as good product.

step S2407: if the inspection result in step S2405 is drive NG, the mounting board is inspected. For example, the mounting failure such as positional deviation of the part mounted on the print circuit board is detected by performing scanning over the entire surface by a laser light and detecting the scattered light reflected from the print circuit board (for example, refer to patent document 2).

step S2408: whether the result of the mounting board inspection in step S2407 is OK or NG is judged.

step S2409: when the result of the mounting board inspection is judged as NG in step S2408, the mounting failure portion is specified, and a re-mounting of a part is performed.

step S2410: when the result of the mounting board inspection is determined as OK, whether the part mounted on the drive board has failure or not is analyzed.

step S2411: based on the analysis result in step S2401, whether the drive board includes failure or not is judged.

step S2412: if some part is determined as including failure in step S2411, the drive is determined as NG.

step S2413: if no part is determined as including failure in step S2411, an evaluation program for specifying a failure portion is created, and the processing returns to step S2401 thereby to perform a re-evaluation.

Next, the failure analysis method for the peripheral device according to the first embodiment will be described, particularly, in cases (E4) where there is a cause of failure outside the LSI, (E5) where there is a cause of failure inside the LSI, and (E6) where there is a cause of failure at the connection portion with the LSI, with reference to FIG. 24.

(E4) where there is a cause of failure outside the LS1,

E401: in step S2401, the LSI evaluation program is transferred from the computer 200 to the peripheral device 100, and the inspection of the LSI is performed.

E402: in step S2402, whether the result of the LSI inspection is OK or NG is judged. Then, the value of the Status register read out from the computer 200 is as shown in FIG. 25. Here, from above in FIG. 25, (251) which is a system control microcomputer result register, (252) which is a DRC result register, (253) which is an analogue result register, (254) which is a servo result register, (255) which is a host result register, and (256) which is an ECC result register, are all 0x10, indicating no failure. Therefore, the inspection result is judged as OK, and the processing transits to step S2404.

E403: in step S2404, the drive evaluation program is transferred from the computer 200 to the peripheral device 100, and the drive inspection is performed.

E404: in step S2405, whether the result of the drive inspection is OK or NG is judged. Then, the value of the Status register read out from the computer 200 is as (257) shown in FIG. 25. In FIG. 25, the value of the Status register shows 0xFF, indicating the failure of the disc system path. Therefore, the inspection result is judged as NG, and the processing transits to step S2407.

E405: since in step S2405 the drive is judged as NG, the mounting board is inspected in step S2407. For example, the mounting failure such as positional deviation of the part mounted on the print circuit board is detected by performing scanning over the entire surface by a laser light and detecting the scattered light reflected from the print circuit board (for example, patent document 2).

E406: in step S2408, whether the result of the mounting board inspection is OK or NG is judged.

E407: if the result of the mounting board inspection is judged as NG, the location of the mounting failure is specified, and a part is re-mounted.

E408: in step S2410, whether the part mounted on the drive board includes failure or not is analyzed.

E409: in step S2411, on the basis of the analysis result in step S2410, whether the part mounted on the drive board includes failure or not is judged. As a result, it is judged as some mounted part including failure, and the processing transits to step S2412.

E410: in step 2411, it is judged as the mounted part including failure, it is judged as the drive is NG in step S2412.

(E5) where the cause of failure is present inside the LS1,

E501: in step S2402: in step S2401, the LSI program is transferred from the computer 200 to the peripheral device 100, and the inspection of the LSI is performed.

E502: in step S2402, whether the result of the LSI inspection is OK or NG is judged. Then, the value of the Status register is as shown in FIG. 26. In FIG. 26, the DRC register (262), the servo result register (264), and the ECC result register (266) are 0xFF, showing failure in the DRC function, the servo function, and the ECC function, respectively, and therefore, the LSI is judges as NG.

E503: since the inspection result in step S2402 is NG, the LSI as the inspection target is determined as NG in step S2403, and then the LSI is peeled off and an inspection is performed by an LSI evaluation board and a tester.

(E6) where the cause of failure is present in the connection portion with the LS1, E601: in step S2401, the LSI evaluation program is transferred from the computer 200 to the peripheral device 100, and an inspection of the LSI is performed.

E602: in step S2402, whether the result of the LSI inspection is OK or NG is judged. Then, the value of the Status register read out from the computer 200 is as shown in FIG. 27. In FIG. 27, the system control microcomputer result register (271), the DRC register (272), the analog result register (272), the servo result register (274), the host result register (275), and the ECC result register (276) are all 0x10, indicating no failure, the result of the LSI inspection is judges as OK, and the processing transits to step S2404.

E603: in step S2404, the drive evaluation program is transferred from the computer 200 to the peripheral device 100 and the drive inspection is carried out.

E604: in step S2405, whether the result of the drive inspection OK or NG is judged. Then, the value of the Status register which was read out from the computer 200 is as (277) in FIG. 27. In FIG. 27, since the value of the Status register is 0xFF, indicating a disc system path failure, the result of the drive inspection is determined as NG and the processing transits to step S2407.

E605: since in step S2405, the drive is judged as NG, the mounting board is inspected in step S2407. For example, the mounting failure such as the positional deviation of the part mounted on the print circuit board is detected by performing scanning over the entire surface by a laser light and detecting the scattered light reflected from the print circuit board.

E606: in step S2408, whether the result of the mounting board inspection is OK or NG is judged.

E607: since in step S2408, the result of the mounting board inspection is determined as NG, the location of the mounting failure is specified, and the part is re-mounted.

As described above, a peripheral device according to the first embodiment of the present invention is provided a detection section 10 which is connected to the computer 200 through an interface cable 3 and detects whether a mode indicating signal which is transmitted from computer 200 and which indicates the test mode or the normal mode, a second memory device 13 which stores the evaluation program which is transmitted from the computer 200 and which is for evaluating the peripheral device and the integrated circuit for a peripheral device, and a start means 15 which, when the detection section 10 detects the test mode and the integrated circuit 400 transits to the test mode, resets the program being executed and starts the evaluation program 22 on the second memory device 13, and evaluates the states of the peripheral device 100 and the integrated circuit 400 and communicates the results to the computer 200. Therefore, it is possible to carry out failure analysis of the peripheral device 100 and the integrated circuit 400 in a state where the peripheral device 100 and the integrated circuit 400 are connected to each other, without peeling off the integrated circuit 400 (LSI) from the peripheral device 100 (drive).

In addition, in the failure analysis method of the peripheral device according to the first embodiment, whether the integrated circuit 400 is good product or not is judged by the LSI evaluation program, and when the integrated circuit 400 is judged as good product, whether the peripheral device 100 is good product or not is judged by the drive evaluation program, and when the peripheral device 100 is judged as including failure, the mounting inspection of the peripheral device 100 is performed, and when it is judged as mounting failure existing in the mounting inspection, the mounting failure portion is specified, while when it is judged as including no mounting failure in the mounting inspection, a new evaluation program for specifying failure portion is created, and the re-evaluation of the peripheral device 100 and the integrated circuit 400 are carried out. Thereby, the failure analysis of the peripheral device 100 and the integrated circuit 400 can be carried out in the state where the computer 200 and the peripheral device 100 are connected to each other, without alternately attaching the integrated circuit 400 to the peripheral device 100.

In addition, though in the prior art failure analysis method, the failure of the mounted part itself in the peripheral device cannot be predicted or found by an automatic inspection, the failure analysis method of the first embodiment can judge the failure of the peripheral device 100 in the processing steps (step S2404, step S2405) of the drive inspection employing the drive evaluation program, when the failure exists in the mounted part itself in the peripheral device 100. Therefore, the failure in the peripheral device 100 can be judged, and whether the failure portion is present in the peripheral device 100 or present in the integrated circuit 400 can be predicted and thereby refinement of failure portion is enabled.

Further, in the prior art failure analysis method, when there is a failure at the connection portion between the peripheral device 1 and the integrated circuit 4, it was necessary to peel off the integrated circuit 4 from the peripheral device 1, and to perform a tester inspection by using the LSI evaluation board, and further, when the result of the tester inspection was OK, it was necessary to re-mount an integrated circuit, and to perform a re-inspection of the peripheral device 1. In the first embodiment of the present invention, however, since the drive evaluation program includes a program which verifies the path between the peripheral device 100 and the integrated circuit 400, when there is a failure portion at the connection portion between the peripheral device 100 and the integrated circuit 400, the drive failure is detected by the drive evaluation program, and thereafter, a mounting inspection is carried out so as to judge as mounting failure being present and further specify the failure portion. Therefore, even when there is failure at the connection portion between the peripheral device 100 and the integrated circuit 400, the failure portion can be specified without providing the process of alternately attaching the integrated circuit 400 to the peripheral device 100.

While in the first embodiment the peripheral device 100 and the integrated circuit for a peripheral device 400 are evaluated by the evaluation program 22, the present invention is not limited thereto. That is, the peripheral device 100 may be provided with an evaluation circuit which performs an operation equivalent to the evaluation program 22, which evaluation circuit may evaluate the peripheral device 100 and the integrated circuit 400.

Embodiment 2

The peripheral device, the integrated circuit for a peripheral device, and a failure analysis method for the peripheral device according to a second embodiment of the present invention will be described.

Figure 2:
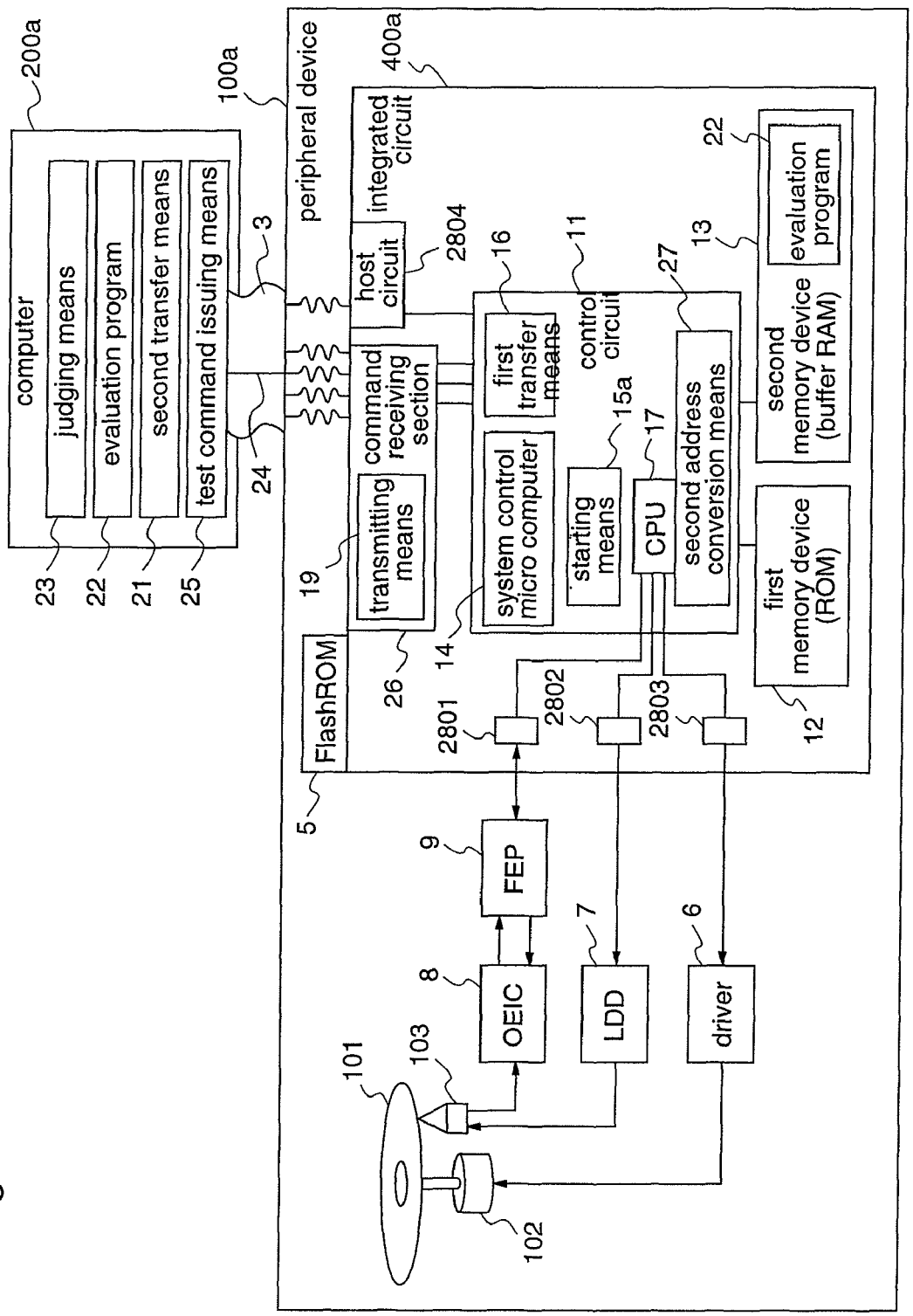
FIG. 2 is a construction example of a peripheral device and an integrated circuit for a peripheral circuit, and a computer which is connected to the peripheral device, according to a second embodiment of the present invention.

FIG. 2 is a diagram illustrating a construction example of a peripheral device and an integrated circuit for a peripheral device, and a computer which is connected to the peripheral device, according to the second embodiment.

The peripheral device 100a and the computer 200a connected to the peripheral device 100a of this second embodiment are different from the peripheral device 100 and the computer 200 connected to the peripheral device 100 in the first embodiment in the following points.

The computer 200a is provided with a test command issuing means 25 in place of the mode driving means 20. The test command issuing means 25 issues a test command to transmit same to the peripheral device 100a. Here, as the test command, it is concretely assumed that a test command is assigned to one among the user definition commands which the uses independently uses among the command codes and parameter tables which are described in the ATA/ATAPI standard specifications (Vender Specific Commands or Vendor Unique Commands), and as its function, the evaluation program is started.

The integrated circuit 400a of the peripheral device 100a is provided with a command receiving section 26 in place of the detection section 10. The command reception section 26 receives the command which was issued by the test command issuing means 25. In addition, the second address conversion means 27 is provided with a second address conversion means 27 in place of the address conversion means 27. The second address conversion means 27 transits to the test mode when the command receiving section 26 receives the test command. In addition, the starting means 15a starts the program on the first memory means 12 when the command receiving section 26 receives the normal command, and starts the program on the second memory means 13 when the command reception section 26 receives the test command.

Next, the operations of the peripheral device 100a and the computer 200 connected to the peripheral device 100a according to the second embodiment will be described with reference to FIG. 6.

step S33: the test command issuing means 26 in the computer 200a issues a test command to the peripheral device 100a and the computer 200a enters the status receiving state.

step S34: the command receiving section 26 in the peripheral device 100a receives the test command and the processing transits to step S35.

step S35: the transmission means 19 in the peripheral device 100a transmits the status to the computer 200. More concretely, the value indicating the reception of the test command is written in into the ATAPI data register (ADAT register) or the status register (ASTA register) show in FIG. 22.

step S36: whether the judging means 23 in the computer 200a has received the status from the peripheral device 100a is judged, and the connection failure is judged when the status is not received.

step S37: the judging means 23 in the computer 200a starts the evaluation routine for the peripheral device in the evaluation program 22 when that the reception of the status is judged in step S34. The evaluation routine for the peripheral device will be described later.

step S38: the judging means 23 in the computer 200a judges as the LSI error when the value which indicates that the evaluation result of the evaluation routine of the peripheral device shows the integrated circuit (LSI) failure is received from the peripheral device 100a, and judges as good product otherwise.

Next, the details of the first evaluation routines for the peripheral device shown in FIG. 6 will be described. In this second embodiment, there are two evaluation routines for the peripheral device.

Figure 7:
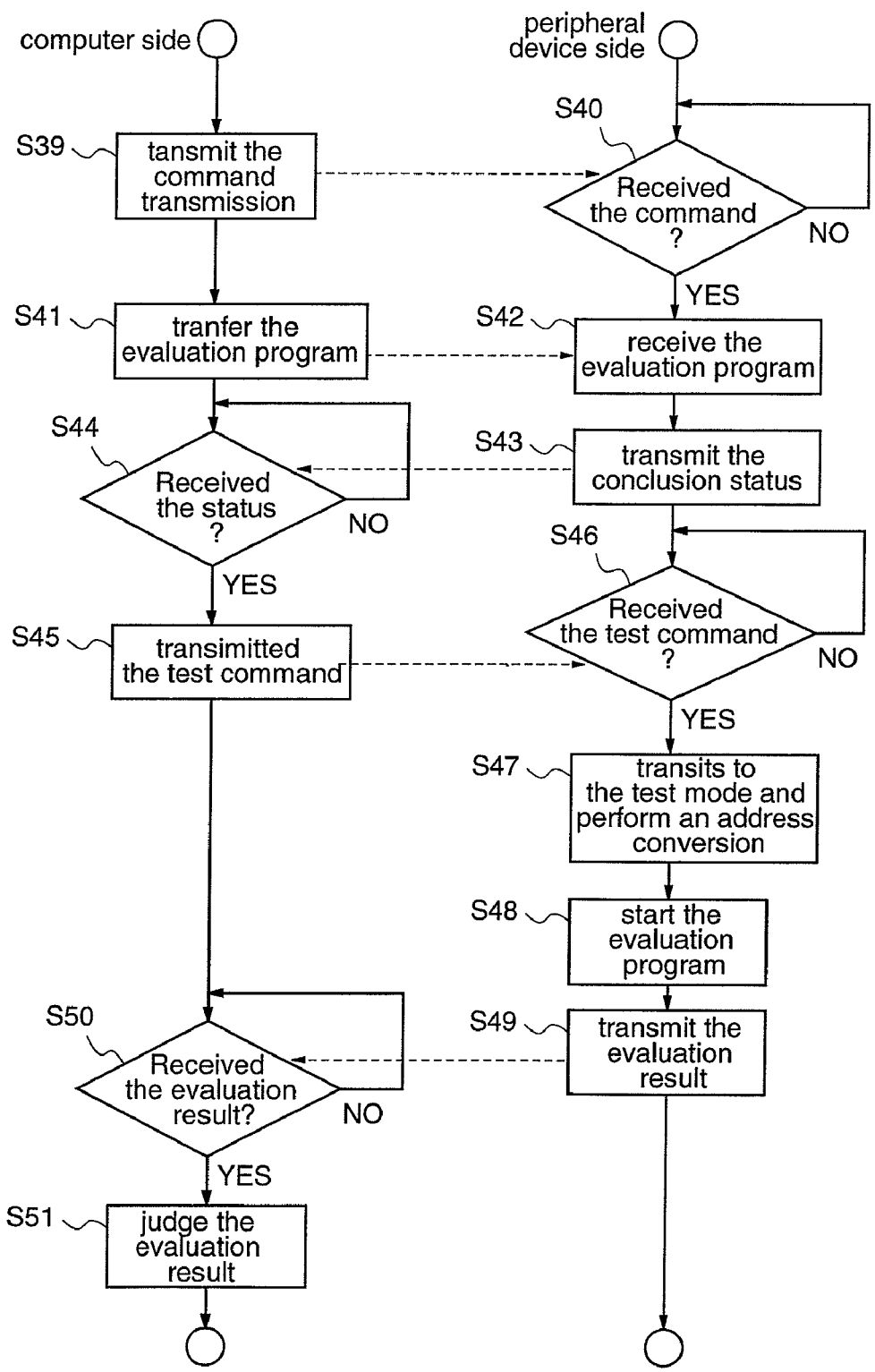
FIG. 7 is a flow diagram illustrating a first peripheral equipment evaluation routine in the failure analysis method of a peripheral device, according to the second embodiment of the present invention.

FIG. 7 is a flow diagram illustrating a first evaluation routine for the peripheral device according to the second embodiment.

step S39: the second transfer means 21 in the computer 200a transmits a data transfer command to the peripheral device 100a. More concretely, it transmits a Write system command as ATA/ATAPI command.

step S40: the peripheral device 100a receives the data transfer command transmitted from the computer 200a.

step S41: the second transfer means 21 in the computer 200a transfers the evaluation program 22 to the peripheral device 100a.

step S42: the peripheral device 100a receives the evaluation program 22 transmitted from the computer 200a, and the first transfer means 16 transfers the evaluation program 22 to the second memory device 13.

step S44: the computer 200a receives the conclusion status.

step S45: the test command issuing means 25 in the computer 200a transmits a test command.

step S46: the test command receiving section 26 in the peripheral device 100a receives the test command.

step S47: the second address conversion means 27 in the peripheral device 100a transits to the test mode. Thereby, the address accessed by the CPU 17 is switched from the first memory device 12 to the second memory device 13.

step S48: the starting means 15a in the peripheral device 100a resets the program being executed and starts the evaluation program 22.

step S49: the state of the integrated circuit 400a is evaluated by the evaluation program 22, and the evaluation result is transmitted to the computer 200a.

step S50: whether the judging means 23 in the computer 200a judges whether the evaluation result is received or not.

step S51: the judging means 23 starts, when it received the evaluation result in step S50, the evaluation program 22, and judges the evaluation result.

Figure 8:
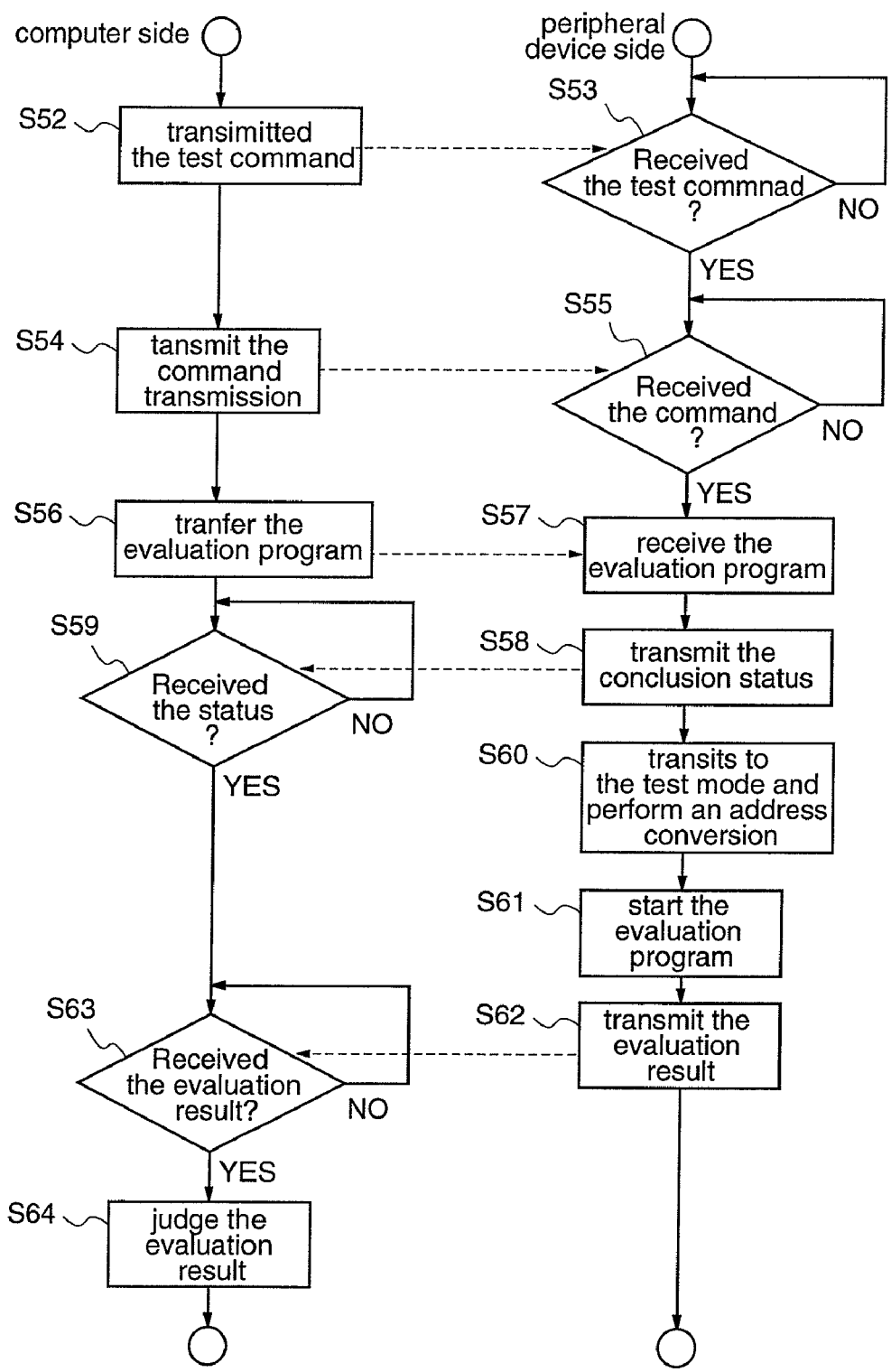
FIG. 8 is a flow diagram illustrating a second peripheral equipment evaluation routine in the failure analysis method of a peripheral device, according to the second embodiment of the present invention.

Next, the second evaluation routine for the peripheral device will be described. FIG. 8 is a flow diagram illustrating a second evaluation routine for the peripheral device.

step S52: the test command issuing means 25 in the computer 200a issues a test command.

step S53: the test command receiving section 26 in the peripheral device 100a receives the test command.

step S54: the second transfer means 21 in the computer 200a transmits a data transfer command to the peripheral device 100a. More concretely, it transmits a Write system command as ATA/ATAPI command.

step S55: the peripheral device 100a receives the data transfer command transmitted from the computer 200a.

step S56: the second transfer means 21 in the computer 200a transfers the evaluation program 22 to the peripheral device 100a.

step S57: the first transfer means 16 in the peripheral device 100a receives the evaluation program 22 transmitted from the computer 200a, and transfers it to the second memory device 13.

step S58: the peripheral device 100a transmits the conclusion status to the computer 200a.

step S59: the computer 200a receives the conclusion status.

step S60: the second address conversion means 27 in the peripheral device 100a transits to the test mode. Thereby, the address accessed by the CPU 17 is switched from the first memory device 12 to the second memory device 13.

step S61: the starting means 15a in the peripheral device 100a resets the program being executed and starts the evaluation program 22.

step S62: the evaluation program 22 evaluates the state of the integrated circuit 400a, and the evaluation result is transmitted to the computer 200a.

step S63: the judging means 23 in the computer 200a judges whether the evaluation result is received or not.

step S64: the judging means 23 starts, when the evaluation result is received in step S63, the evaluation program and judges the evaluation result.

Next, the failure analysis method for the peripheral device according to the second embodiment will be described with reference to FIG. 33. FIG. 33 is a diagram illustrating the ATA/ATAPI protocol between the peripheral device 100a and the computer 200a. Here, the processing steps in the failure analysis method will be described with reference to FIGS. 6 and 8.

Figure 6:
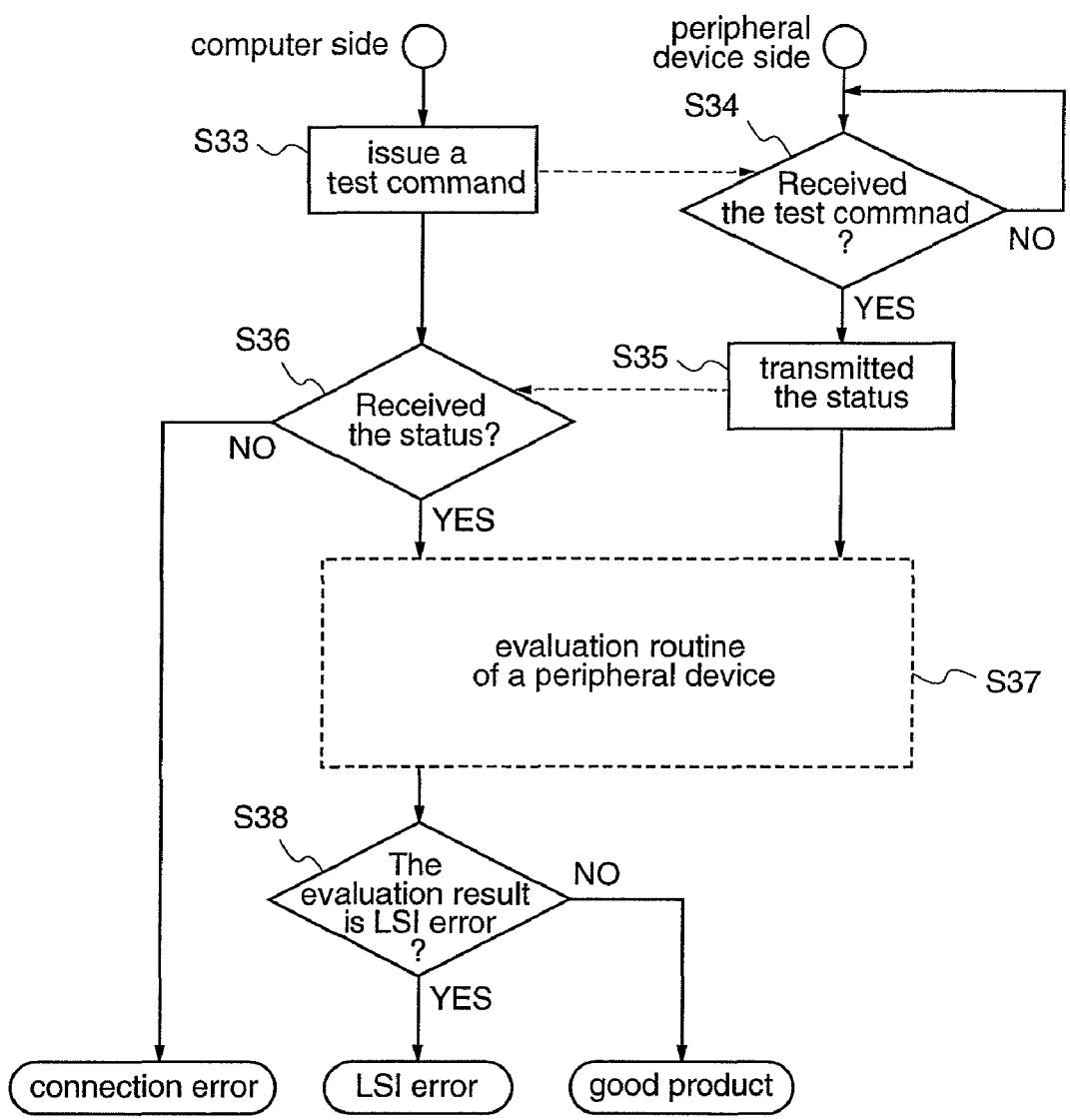
FIG. 6 is a flow diagram illustrating a failure analysis method of a peripheral device, according to a second embodiment of the present invention.

(331) By step S31 shown in FIG. 6, the test command issuing means 25 in the computer 200a issues a test command to the peripheral device 100a.

(332) By steps of step S35, step S36 shown in FIG. 6, 0x01 is obtained for address 0x1F7.

(333) By step S52 shown in FIG. 8, the second transfer means 21 in the computer 200a issues a packet command of ATA command.

(334) to (345) By step S54 shown in FIG. 8, the second transfer means 21 in the computer 200a issues a Write (10) command as ATAPI command, and also issues parameters (LBA, transfer length).

(346) to (348) By step S56 shown in FIG. 8, the second transfer means 21 in the computer 200a transfers the evaluation program 22 to the peripheral device 100a.

(349) By step S58 shown in FIG. 8, the peripheral device 100a transmits the conclusion status 0x00.

(350) to (356) By step S63 shown in FIG. 8, the judging means 23 in the computer 200a receives the evaluation result. The received evaluation results are as such that the evaluation result of the system controller microcomputer is OK (350), the evaluation result of the DRC is NG (351), the evaluation result of the analog circuit is OK (352), the evaluation result of the servo circuit is NG (355), and the evaluation result of the disc path is NG (356) as shown in FIG. 33. Such evaluation results are judged by the judging means 23 in the computer 200a in step S64 shown in FIG. 8.

According to the peripheral device according to the second embodiment of the present invention, the peripheral device 100a and the computer 200a are connected through an interface cable 3, the peripheral device 100a includes a command receiving section 26 which receives the test command that is issued by the test command issuing means 25 in the computer 200a, the second memory device 13 which stores the evaluation program which is transmitted from the computer 200a, and the starting means 15a which resets the program at the normal mode and starts the evaluation program 22 on the second memory device 13, and it evaluates the states of the peripheral device 100a and the integrated circuit 400a by the evaluation program 22 and communicates the results to the computer 200a. Therefore, the failure analysis of the peripheral device 100a and the integrated circuit 400a can be carried out in a state where the peripheral integrated circuit 100a and the integrated circuit 400a are connected to each other, without peeling off the integrated circuit 400a (LSI) from the peripheral device 100a (drive).

The present invention is useful as a peripheral device as an optical disc device such as a DVD player/recorder, a CD player/recorder, a hard disc, a printer, a digital video camera, and a scanner, and a failure analysis method for an integrated circuit for a peripheral device. In addition, the present invention can be applied to a scan design which makes a path for a sequential circuit test mode in the logic circuits so as to perform a control through the path, and make it operate as a shift register.

The invention claimed is:

1. A peripheral device which is connected to a computer through an interface, comprising:
 a detection section configured to interpret a mode indicating signal sent via an interface, which is outputted from the computer and indicates a normal mode or a test mode, and detect the normal mode and the test mode;
 a first memory device for storing a program which is executed by the peripheral device in the normal mode;
 a second memory device configured to store an evaluation program that is transmitted from the computer, the evaluation program being for evaluating the peripheral device and the integrated circuit for the peripheral device; and
 a starting means for starting the program in the first memory device when the normal mode is detected by the detection section, and for starting the evaluation program stored in the second memory device, wherein the evaluation program is for evaluating the peripheral device and the integrated circuit for the peripheral device, when the test mode is detected by the detection section.

2. A peripheral device which is connected to a computer through an interface, comprising:
 a command receiving section configured to receive a command signal via an interface, which is a command outputted from the computer;
 a first memory device configured to store a program which is executed by the peripheral device in a normal mode;
 a second memory device configured to store an evaluation program that is transmitted from the computer, the evaluation program being for evaluating the peripheral device and the integrated circuit for the peripheral device; and
 a starting means for starting the program in the first memory device when the command receiving section has received a command signal indicating the normal mode, and for starting the evaluation program for evaluating the peripheral device and the integrated circuit for the peripheral device in the second memory device when the command receiving section has received a command signal indicating a test mode.

3. A peripheral device as defined in claim 1, further comprising:
 a transfer means for, when the test mode is detected by the detection section, receiving from the computer the evaluation program for evaluating the peripheral device and the integrated circuit for the peripheral device, and transferring the evaluation program to the second memory device.

4. A peripheral device as defined in claim 1, wherein the mode indicating signal is an ATA interface bus signal.

5. A peripheral device as defined in claim 2, further comprising:
 a transfer means for, when the command receiving section receives the command indicating the test mode, receiving from the computer the evaluation program for evaluating the peripheral device and the integrated circuit for the peripheral device, and transferring the evaluation program to the second memory device.

6. An integrated circuit for a peripheral device which is connected to a computer through an interface, comprising:
 a detection section which interprets configured to interpret a mode indicating signal sent via an interface, which is outputted from the computer and indicates a normal mode or a test mode, and detect the normal mode and the test mode;
 a first memory device configured to store a program which is executed by the peripheral device in the normal mode;
 a second memory device configured to store an evaluation program that is transmitted from the computer, the evaluation program being for evaluating the peripheral device and the integrated circuit for the peripheral device; and
 a starting means for starting the program in the first memory device when the normal mode is detected by the detection section, and for starting the evaluation program in the second memory device, wherein the evaluation program is for evaluating the peripheral device and the integrated circuit for the peripheral device, when the test mode is detected by the detection section.

7. An integrated circuit for a peripheral device which is connected to a computer through an interface, comprising:
 a command receiving section configured to receive a command signal sent via an interface, which is a command outputted from the computer;
 a first memory device configured to store a program which is executed by the peripheral device in a normal mode;
 a second memory device configured to store an evaluation program that is transmitted from the computer, the evaluation program being for evaluating the peripheral device and the integrated circuit for the peripheral device; and
 a starting means for starting the program in the first memory device when the normal mode is detected by the detection section, and for starting the evaluation program in the second memory device for evaluating the peripheral device and the integrated circuit for the peripheral device when the test mode is detected by the detection section.

8. An integrated circuit for a peripheral device as defined in claim 6, further comprising:
 a transfer means for, when the test mode is detected by the detection section, receiving from the computer the evaluation program for evaluating the peripheral device and the integrated circuit for the peripheral device.

9. An integrated circuit for a peripheral device as defined in claim 7, further comprising:
a transfer means for, when the test mode is detected by the command receiving section, receiving from the computer the evaluation program for evaluating the peripheral device and the integrated circuit for the peripheral device.

10. A failure analysis system which performs a failure analysis of a peripheral device and an integrated circuit for a peripheral device, comprising:
a computer including:
a first transfer means for transferring an evaluation program for evaluating the peripheral device and the integrated circuit for the peripheral device to the peripheral device through an interface;
a mode driving means for outputting a mode indicating signal via an interface, which is a signal indicating whether the peripheral device is operated in a normal mode or in a test mode to the peripheral device; and
a judging means for judging the evaluation result of the peripheral device and the integrated circuit, obtained by the evaluation program, and
the peripheral device including:
a detection section configured to interpret the mode indicating signal sent via an interface, which is outputted from the computer and indicates a normal mode or a test mode, and detect the normal mode and the test mode;
a first memory device configured to store a program which is executed by the peripheral device in the normal mode;
a second memory device configured to store the evaluation program that is transmitted from the computer, the evaluation program being for evaluating the peripheral device and the integrated circuit for the peripheral device; and
a second transfer means for, when the test mode is detected by the detection section, receiving from the computer the evaluation program for evaluating the peripheral device and the integrated circuit for the peripheral device, and transferring the evaluation program to the second memory device; and
a starting means for starting the program in the first memory device when the normal mode is detected by the detection section, and for starting the evaluation program in the second memory device, wherein the evaluation program is for evaluating the peripheral device and the integrated circuit for the peripheral device when the test mode is detected by the detection section; and
a communication means for communicating the evaluation result of the peripheral device and the integrated circuit for the peripheral device to the computer, wherein
the judging means in the computer, when the evaluation result of the peripheral device and the integrated circuit are received, starts the evaluation program in the computer and judges a state of the peripheral device and the integrated circuit.

11. A failure analysis system which performs a failure analysis of a peripheral device and an integrated circuit for a peripheral device, comprising:
a computer including:
a first transfer means for transferring an evaluation program for evaluating the peripheral device and the integrated circuit for the peripheral device to the peripheral device through an interface;
a command issuing means which outputs a command to the peripheral device;
a judging means for judging the evaluation result of the peripheral device and the integrated circuit, obtained by the evaluation program, and
the peripheral device including:
a command receiving section configured to receive a command sent via an interface, which is a command outputted from the computer;
a first memory device configured to store a program which is executed by the peripheral device in a normal mode;
a second memory device configured to store the evaluation program that is transmitted from the computer, the evaluation program being for evaluating the peripheral device and the integrated circuit for the peripheral device;
a second transfer means for, when the test mode is detected by the command receiving section, receiving from the computer the evaluation program for evaluating the peripheral device and the integrated circuit for the peripheral device, and transferring the evaluation program to the second memory device; and
a starting means for starting the program in the first memory device when the command receiving section has received a command indicating the normal mode, and starting the evaluation program stored in the second memory device, wherein the evaluation program is for evaluating the peripheral device and the integrated circuit for the peripheral device, when the command receiving section has received a command indicating a test mode; wherein
the judging means in the computer, when the evaluation result obtained on the peripheral device and the integrated circuit is received, starts the evaluation program in the computer and judges the state of the peripheral device and the integrated circuit.

12. A failure analysis method which performs a failure analysis of a peripheral device which is connected to a computer through an interface and an integrated circuit for the peripheral device, comprising:
a transmission step of transmitting to the peripheral device through an interface a mode indicating signal, which indicates whether the peripheral device is operated in a normal mode or in a test mode;
a transfer step of transferring an evaluation program for evaluating the peripheral device and the integrated circuit for the peripheral device to the peripheral device from the computer;
a detection step of interpreting the mode indicating signal sent via the interface, and detecting the normal mode and the test mode;
a receiving step of receiving the evaluation program for evaluating the peripheral device;
a mode transiting step of, when that the mode indicating signal indicates the test mode is detected in the mode detecting step, making the peripheral device transit to the test mode;
a starting step of, when the transition to the test mode from a normal mode has occurred, resetting a program being executed and starting the evaluation program for evaluating the peripheral device and the integrated circuit for the peripheral device;
an evaluation step of evaluating the peripheral device and the integrated circuit for the peripheral device using the evaluation program for evaluating the peripheral device and the integrated circuit;
a communication step of communicating the evaluation result obtained in the evaluation step to the computer from the peripheral device;
a judging step of, when the computer has not received the evaluation result from the peripheral device, judging that a connection error exists between the computer and the peripheral device, and when the computer has received the evaluation result from the peripheral device, starting the evaluation program in the computer, and judging the state of the peripheral device and the integrated circuit on the basis of the evaluation result.

13. A failure analysis method as recited in claim 12, wherein the transfer step further comprises, after the mode indicating signal indicating the test mode is transmitted in the transmission step, transferring the evaluation program for evaluating the peripheral device and the integrated circuit for the peripheral device from the computer to the peripheral device, the receiving step further comprises, when that the mode indicating signal indicates the test mode is detected in the detecting step, receiving the evaluation program which is transmitted from the computer and which is for evaluating the peripheral device and the integrated circuit for the peripheral device, and the mode transfer step further comprises, after the reception of the evaluation program for evaluating the peripheral device and the integrated circuit for the peripheral device is completed, making the peripheral device transit to the test mode.

14. A failure analysis method as defined in claim 12, wherein the transmission step further comprises, after the transfer of the evaluation program for evaluating the peripheral equipment device and the integrated circuit for the peripheral device in the transfer step is completed, transmitting a mode indicating signal indicating a test mode from the computer to the peripheral device, and the mode transfer step further comprises, when that the mode indicating signal indicates a test mode is detected in the detection step, making the peripheral device transit to the test mode.

15. A failure analysis method as defined in claim 12, wherein the evaluation program includes an integrated circuit evaluation program for evaluating the state of the integrated circuit, and a peripheral device evaluation program for evaluating the state of the peripheral device, and the evaluation step comprises:

an integrated circuit evaluation step of judging whether the integrated circuit is a good product or not by the integrated circuit evaluation program; and a peripheral device evaluation step of judging, when the integrated circuit is determined as a good product in the integrated circuit evaluation program, whether the peripheral device is a good product or not by the peripheral device evaluation program;

a mounting inspection step of performing, when the peripheral device is determined not to be a good product in the peripheral device evaluation step, mounting inspection of the peripheral device;

a specifying step of, when it is determined as including a mounting failure in the mounting inspection step, specifying a mounting failure portion in the peripheral device; and a producing step of, when it is determined as a successful mounting in the mounting inspection step, producing an evaluation program for specifying the mounting failure portion in the peripheral device.

16. A failure analysis method as defined in claim 15, the peripheral device evaluation program includes an evaluation program for evaluating a path between the peripheral device and the integrated circuit.

17. A failure analysis method which performs a failure analysis of a peripheral device which is connected to a computer through an interface and an integrated circuit for a peripheral device, comprising:

a command issuing step of issuing a test command signal via an interface, which is a command outputted from the computer to the peripheral device, a command receiving step of receiving the command by the peripheral device;

a transfer step of transferring from the computer to the peripheral device an evaluation program for evaluating the peripheral device and the integrated circuit for the peripheral device;

a program receiving step of receiving the evaluation program for evaluating the peripheral device and the integrated circuit for the peripheral device by the peripheral device;

a starting step of, when the test command indicating a test mode is received in the command receiving step, resetting the program being executed in a normal mode, and starting the evaluation program for evaluating the peripheral device and the integrated device for a peripheral device in the peripheral device;

an evaluation step of evaluating the peripheral device and the integrated circuit by the evaluation program;

a communication step of communicating the evaluation result obtained in the evaluation step from the peripheral device to the computer;

a judging step of, when the computer does not receive the evaluation result from the peripheral device, judging that a connection error exists between the computer and the peripheral device, and when the computer has received the evaluation result from the peripheral device, starting the evaluation program in the computer, and judging a state of the peripheral device and the integrated circuit on the basis of the evaluation result.

18. A failure analysis method as defined in claim 17, wherein the transfer step further comprises, after issuing the test command indicating the test mode in the command issuing step, transferring from the computer to the peripheral device the evaluation program for evaluating the peripheral device and the integrated circuit for the peripheral device, the program receiving step further comprises, when the test command indicating the test mode is received in the command receiving step, receiving the evaluation program for evaluating the peripheral device and the integrated circuit for the peripheral device, and the test mode transiting step comprises, when the reception of the evaluation program for evaluating the peripheral device and the integrated circuit for the peripheral device is completed, making the peripheral device transit to the test mode.

19. A failure analysis method as defined in claim 17, wherein the command issuing step comprises, after the evaluation program for evaluating the peripheral device and the integrated circuit for the peripheral device is transferred from the computer to the peripheral device, issuing the test command indicating the test mode, and the mode transferring step comprises, when the test command is received in the command receiving step, making the peripheral device transit to the test mode.

* * * * *